United States Patent
Conrad et al.

(10) Patent No.: US 10,149,587 B2
(45) Date of Patent: Dec. 11, 2018

(54) CYCLONE ASSEMBLY FOR SURFACE CLEANING APPARATUS AND A SURFACE CLEANING APPARATUS HAVING SAME

(71) Applicant: Omachron Intellectual Property Inc., Hampton (CA)

(72) Inventors: Wayne Ernest Conrad, Hampton (CA); Dave Petersen, Bowmanville (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 0 days.

(21) Appl. No.: 15/411,302

(22) Filed: Jan. 20, 2017

(65) Prior Publication Data
US 2017/0303758 A1  Oct. 26, 2017

Related U.S. Application Data

(63) Continuation-in-part of application No. 15/137,814, filed on Apr. 25, 2016.

(51) Int. Cl.
*B01D 45/00* (2006.01)
*A47L 9/16* (2006.01)
(Continued)

(52) U.S. Cl.
CPC .............. *A47L 9/1633* (2013.01); *A47L 5/30* (2013.01); *A47L 5/32* (2013.01); *A47L 9/1608* (2013.01);
(Continued)

(58) Field of Classification Search
CPC .... A47L 9/1641; A47L 9/1625; A47L 9/1683; A47L 9/165; A47L 9/1666; A47L 9/1633;
(Continued)

(56) References Cited

U.S. PATENT DOCUMENTS 2,370,444 A * 2/1945 Bowman ................ B01D 45/12
55/344
2,754,968 A * 7/1956 Hage ......................... B04C 5/04
209/729
(Continued)

FOREIGN PATENT DOCUMENTS

CN  1729924 A  2/2006
CN  1875846 A  12/2006
(Continued)

OTHER PUBLICATIONS

English translation of CN1875846, as published on Dec. 13, 2006.
(Continued)

*Primary Examiner* — Dung H Bui
(74) *Attorney, Agent, or Firm* — Philip C. Mendes da Costa; Bereskin & Parr LLP/S.E.N.C.R.L., s.r.l.

(57) ABSTRACT

A cyclone assembly for a surface cleaning apparatus has a first cyclonic cleaning stage having a first end moveable between a closed position in which a first stage cyclone chamber and a first stage dirt collection chamber are closed and an open position in which the first stage cyclone chamber and the first stage dirt collection chamber are open, and a second cyclonic cleaning stage having a second end moveable between a closed position in which a plurality of second stage cyclone chambers and at least one second stage dirt collection chamber are closed and an open position in which the second stage cyclone chambers and the second stage dirt collection chamber are open.

19 Claims, 27 Drawing Sheets

(51) Int. Cl.
*B04C 5/26* (2006.01)
*B04C 5/28* (2006.01)
*B04C 5/185* (2006.01)
*B01D 45/12* (2006.01)
*A47L 5/30* (2006.01)
*A47L 5/32* (2006.01)
*A47L 9/22* (2006.01)
*B01D 46/16* (2006.01)
*B01D 50/00* (2006.01)

(52) U.S. Cl.
CPC ........... *A47L 9/1641* (2013.01); *A47L 9/1683* (2013.01); *A47L 9/22* (2013.01); *B01D 45/12* (2013.01); *B04C 5/185* (2013.01); *B04C 5/26* (2013.01); *B04C 5/28* (2013.01); *B01D 46/16* (2013.01); *B01D 50/002* (2013.01)

(58) Field of Classification Search
CPC ......... A47L 9/1608; B04C 5/185; B04C 5/26; B04C 5/28; B01D 45/16; B01D 50/002; B01D 45/12
See application file for complete search history.

(56) References Cited

U.S. PATENT DOCUMENTS

| | | | |
|---|---|---|---|
| 3,425,192 A | 2/1969 | Davis | |
| 4,235,363 A * | 11/1980 | Liller | B04C 5/081 209/732 |
| 6,192,515 B1 | 2/2001 | Doshi et al. | |
| 6,334,234 B1 | 1/2002 | Conrad et al. | |
| 6,341,404 B1 * | 1/2002 | Salo | A47L 5/28 15/350 |
| 6,607,407 B2 | 8/2003 | Takatsuki et al. | |
| 7,065,826 B1 | 6/2006 | Arnold | |
| 7,335,242 B2 | 2/2008 | Oh | |
| 7,488,362 B2 | 2/2009 | Jeong et al. | |
| 7,494,523 B2 * | 2/2009 | Oh | A47L 9/1625 55/343 |
| 7,540,894 B2 | 6/2009 | Ni | |
| 7,645,309 B2 | 1/2010 | Jeong et al. | |
| 7,651,544 B1 * | 1/2010 | Fester | A47L 9/122 55/343 |
| 7,803,207 B2 | 9/2010 | Conrad | |
| 7,857,878 B2 | 12/2010 | Park et al. | |
| 7,867,308 B2 * | 1/2011 | Conrad | A47L 9/1608 15/352 |
| 7,887,612 B2 | 2/2011 | Conrad | |
| 7,931,716 B2 | 4/2011 | Oakham | |
| 7,951,218 B2 * | 5/2011 | Oh | A47L 9/1625 15/352 |
| 8,192,515 B2 | 6/2012 | Conrad | |
| 8,282,697 B2 * | 10/2012 | Oh | A47L 9/1625 15/352 |
| 8,607,407 B2 | 12/2013 | Conrad | |
| 9,066,643 B2 | 6/2015 | Conrad | |
| 9,211,046 B2 | 12/2015 | Peace | |
| 9,629,511 B2 * | 4/2017 | Conrad | A47L 9/1683 |
| 2002/0088079 A1 * | 7/2002 | Oh | A47L 9/1427 15/352 |
| 2002/0116907 A1 * | 8/2002 | Gammack | A47L 9/1625 55/345 |
| 2004/0112022 A1 | 6/2004 | Vuijk | |
| 2005/0252179 A1 * | 11/2005 | Oh | A47L 9/1625 55/337 |
| 2006/0123590 A1 * | 6/2006 | Fester | A47L 9/122 15/353 |
| 2006/0137304 A1 * | 6/2006 | Jeong | A47L 9/1625 55/337 |
| 2006/0137309 A1 * | 6/2006 | Jeong | A47L 5/362 55/337 |
| 2006/0168923 A1 * | 8/2006 | Lee | A47L 9/122 55/345 |
| 2006/0207231 A1 | 9/2006 | Arnold | |
| 2006/0230715 A1 * | 10/2006 | Oh | A47L 9/1658 55/337 |
| 2006/0230717 A1 * | 10/2006 | Oh | A47L 9/1625 55/343 |
| 2006/0230719 A1 * | 10/2006 | Han | A47L 9/1625 55/345 |
| 2006/0230720 A1 * | 10/2006 | Han | A47L 9/1641 55/345 |
| 2006/0254226 A1 | 11/2006 | Jeon | |
| 2006/0286499 A1 * | 12/2006 | Kim | A47L 9/1625 432/106 |
| 2007/0011999 A1 * | 1/2007 | Oh | A47L 9/1633 55/345 |
| 2007/0079581 A1 * | 4/2007 | Kim | A47L 9/1625 55/345 |
| 2007/0079582 A1 * | 4/2007 | Oh | B04C 5/04 55/345 |
| 2007/0079583 A1 * | 4/2007 | Oh | A47L 9/1608 55/345 |
| 2007/0079584 A1 * | 4/2007 | Kim | A47L 9/1625 55/345 |
| 2007/0079585 A1 * | 4/2007 | Oh | A47L 9/1625 55/345 |
| 2007/0079587 A1 * | 4/2007 | Kim | A47L 9/1608 55/349 |
| 2007/0084160 A1 * | 4/2007 | Kim | A47L 5/28 55/345 |
| 2007/0095030 A1 * | 5/2007 | Oh | A47L 9/1625 55/345 |
| 2008/0104795 A1 | 5/2008 | Lang | |
| 2008/0172995 A1 * | 7/2008 | Conrad | A47L 9/1608 55/345 |
| 2008/0184893 A1 * | 8/2008 | Oh | A47L 9/122 96/416 |
| 2008/0209869 A1 * | 9/2008 | Rother | B01D 45/16 55/337 |
| 2008/0289139 A1 * | 11/2008 | Makarov | A47L 9/1625 15/350 |
| 2009/0100633 A1 * | 4/2009 | Bates | A47L 9/1633 15/347 |
| 2009/0113663 A1 | 5/2009 | Follows et al. | |
| 2009/0181841 A1 * | 7/2009 | Conrad | A47L 9/1625 494/32 |
| 2009/0193771 A1 * | 8/2009 | Oh | A47L 9/1633 55/337 |
| 2009/0241491 A1 | 10/2009 | Han et al. | |
| 2009/0300872 A1 | 12/2009 | Griffith et al. | |
| 2010/0132316 A1 * | 6/2010 | Ni | A47L 9/1625 55/343 |
| 2010/0139033 A1 | 6/2010 | Makarov et al. | |
| 2010/0251506 A1 * | 10/2010 | Conrad | A47L 5/225 15/344 |
| 2010/0251507 A1 * | 10/2010 | Conrad | A47L 5/225 15/347 |
| 2012/0036675 A1 * | 2/2012 | Conrad | A47L 5/28 15/347 |
| 2012/0167336 A1 | 7/2012 | Tran et al. | |
| 2012/0210537 A1 * | 8/2012 | Makarov | A47L 9/1608 15/353 |
| 2012/0222251 A1 * | 9/2012 | Conrad | A47L 9/0018 15/347 |
| 2012/0222252 A1 * | 9/2012 | Conrad | A47L 9/106 15/347 |
| 2012/0222257 A1 * | 9/2012 | Conrad | A47L 9/1683 15/347 |
| 2013/0055691 A1 * | 3/2013 | Kim | A47L 9/1625 55/337 |
| 2013/0091660 A1 | 4/2013 | Smith | |
| 2013/0091661 A1 | 4/2013 | Smith | |
| 2013/0091812 A1 | 4/2013 | Smith | |
| 2013/0091813 A1 | 4/2013 | Smith | |
| 2013/0118960 A1 * | 5/2013 | Tandon | B04C 5/28 210/95 |
| 2013/0227813 A1 * | 9/2013 | Conrad | A47L 9/1683 15/353 |

(56) References Cited

U.S. PATENT DOCUMENTS

| | | | | |
|---|---|---|---|---|
| 2013/0232722 A1* | 9/2013 | Conrad | | A47L 5/28 15/347 |
| 2013/0291334 A1* | 11/2013 | Peng | | A47L 9/1625 15/353 |
| 2014/0245566 A1* | 9/2014 | Conrad | | A47L 9/122 15/353 |
| 2015/0182085 A1* | 7/2015 | Tran | | A47L 9/1633 15/353 |
| 2015/0223657 A1* | 8/2015 | Choe | | A47L 9/1683 15/347 |
| 2015/0359394 A1 | 12/2015 | Peace | | |

FOREIGN PATENT DOCUMENTS

| | | |
|---|---|---|
| CN | 1875855 A | 12/2006 |
| CN | 1887437 A | 1/2007 |
| CN | 1969739 A | 5/2007 |
| CN | 100998484 A | 7/2007 |
| CN | 101108081 A | 1/2008 |
| CN | 101108111 A | 1/2008 |
| CN | 201008534 Y | 1/2008 |
| CN | 201131706 A | 1/2008 |
| CN | 101612025 A | 12/2009 |
| CN | 202277306 U | 6/2012 |
| DE | 60201666 T2 | 6/2006 |
| DE | 202006017010 U1 | 2/2007 |
| DE | 60211663 T2 | 5/2007 |
| DE | 102004028678 B4 | 9/2007 |
| DE | 102007011457 A1 | 10/2007 |
| DE | 102004055192 B4 | 11/2007 |
| DE | 102006027456 A1 | 12/2007 |
| DE | 102004028677 B4 | 1/2008 |
| DE | 102005015004 B4 | 2/2008 |
| DE | 102005008278 B4 | 3/2008 |
| DE | 102006055099 A1 | 5/2008 |
| DE | 102005014541 B4 | 8/2008 |
| DE | 112006003479 T5 | 12/2008 |
| DE | 112007001314 T5 | 4/2009 |
| DE | 602006000726 T2 | 4/2009 |
| DE | 102008055045 A | 6/2010 |
| DE | 112011104642 T5 | 10/2013 |
| DE | 112012000251 T5 | 10/2013 |
| DE | 202010018047 U1 | 11/2013 |
| DE | 202010018084 U1 | 2/2014 |
| DE | 202010018085 U1 | 2/2014 |
| GB | 2454292 A | 5/2009 |
| JP | 08322769 A | 12/1996 |
| JP | 2005342334 A | 12/2005 |
| KR | 1020010024752 A | 3/2001 |
| KR | 1020050108623 A | 11/2005 |
| KR | 1020060008365 A | 1/2006 |
| KR | 1020060081229 A | 7/2006 |
| KR | 1020060118800 A | 11/2006 |
| KR | 1020060118801 A | 11/2006 |
| KR | 1020060122249 A | 11/2006 |
| KR | 1020060122521 A | 11/2006 |
| KR | 1020060125952 A | 12/2006 |
| KR | 1020080039105 A | 5/2008 |
| WO | 2008034325 A1 | 3/2008 |
| WO | 2008065168 A1 | 6/2008 |

OTHER PUBLICATIONS

TotalPatent: English translation of CN1875855, published on Dec. 13, 2006.
TotalPatent:English translation of CN100998484, published on Jul. 18, 2007.
TotalPatent: English translation of CN101108111, published on Jan. 23, 2008.
TotalPatent: English translation of CN101612025, published on Dec. 30, 2009.
TotalPatent: English translation of CN201131706, published on Oct. 15, 2008.
TotalPatent: English translation of DE102008055045, published on Jun. 24, 2010.
TotalPatent: English translation of KR1020060118800, published on Nov. 24, 2006.
Corrected Written Opinion of the International Searching Authority and International Search Report, received on PCT/CA2017/050505, dated Aug. 15, 2017.
International Search Report and the Written Opinion of the International Searching Authority, dated Aug. 15, 2017.
TotalPatent: English translation of JP08322769, published on Dec. 10, 1996.
TotalPatent: English translation of CN1875855, as published on Dec. 13, 2006.
TotalPatent: English translation of CN1969739, as published on May 30, 2007.
TotalPatent:English translation of CN100998484, as published on Jul. 18, 2007.
TotalPatent: English translation of CN101108081, as published on Jan. 23, 2008.
TotalPatent: English translation of CN101108111, as published on Jan. 23, 2008.
TotalPatent: English translation of CN101612025, as published on Dec. 30, 2009.
TotalPatent: English translation of CN201008534, as published on Jan. 23, 2008.
TotalPatent: English translation of CN201131706, as published on Oct. 15, 2008.
TotalPatent: English translation of CN202277306, as published on Jun. 20, 2012.
TotalPatent: English translation of DE60201666, as published on Jun. 1, 2006.
TotalPatent: English translation of DE60211663, as published on May 10, 2007.
TotalPatent: English translation of DE102004028677, as published on Jan. 10, 2008.
TotalPatent: English translation of DE102004028678, as published on Sep. 6, 2007.
TotalPatent: English translation of DE102004055192, as published on Nov. 15, 2007.
TotalPatent: English translation of DE102005008278, as published on Mar. 27, 2008.
TotalPatent: English translation of DE102005014541, as published on Aug. 28, 2008.
TotalPatent: English translation of DE102005015004, as published on Feb. 7, 2008.
TotalPatent: English translation of DE102006027456, as published on Dec. 13, 2007.
TotalPatent: English translation of DE102006055099, as published on May 29, 2008.
TotalPatent: English translation of DE102007011457, as published on Oct. 25, 2007.
TotalPatent: English translation of DE102008055045, as published on Jun. 24, 2010.
TotalPatent: English translation of DE112006003479, as published on Dec. 18, 2008.
TotalPatent: English translation of DE112007001314, as published on Apr. 23, 2009.
TotalPatent: English translation of DE112011104642, as published on Oct. 2, 2013.
TotalPatent: English translation of DE112012000251, as published on Oct. 17, 2013.
TotalPatent: English translation of DE202006017010, as published on Feb. 8, 2007.
TotalPatent: English translation of DE202010018047, as published on Nov. 14, 2013.
TotalPatent: English translation of DE202010018084, as published on Feb. 27, 2007.
TotalPatent: English translation of DE202010018085, as published on Feb. 27, 2007.
TotalPatent: English translation of DE602006000726, as published on Apr. 16, 2009.
TotalPatent: English translation of JP2005342334, as published on Dec. 15, 2005.

(56) References Cited

OTHER PUBLICATIONS

TotalPatent: English translation of KR1020010024752, as published on Mar. 26, 2001.
TotalPatent: English translation of KR1020050108623, as published on Nov. 17, 2005.
TotalPatent: English translation of KR1020060008365, as published on Jan. 26, 2006.
TotalPatent: English translation of KR1020060081229, as published on Jul. 12, 2006.
TotalPatent: English translation of KR1020060118800, as published on Nov. 24, 2006.
TotalPatent: English translation of KR1020060118801, as published on Nov. 24, 2006.
TotalPatent: English translation of KR1020060122249, as published on Nov. 30, 2006.
TotalPatent: English translation of KR1020060122521, as published on Nov. 30, 2006.
TotalPatent: English translation of KR1020060125952, as published on Dec. 7, 2006.
TotalPatent: English translation of KR1020080039105, as published on May 7, 2008.
TotalPatent: English machine translation of CN1729924A, as published on Feb. 8, 2006.
TotalPatent: English machine translation of CN1887437A, as published on Jan. 3, 2007.

* cited by examiner

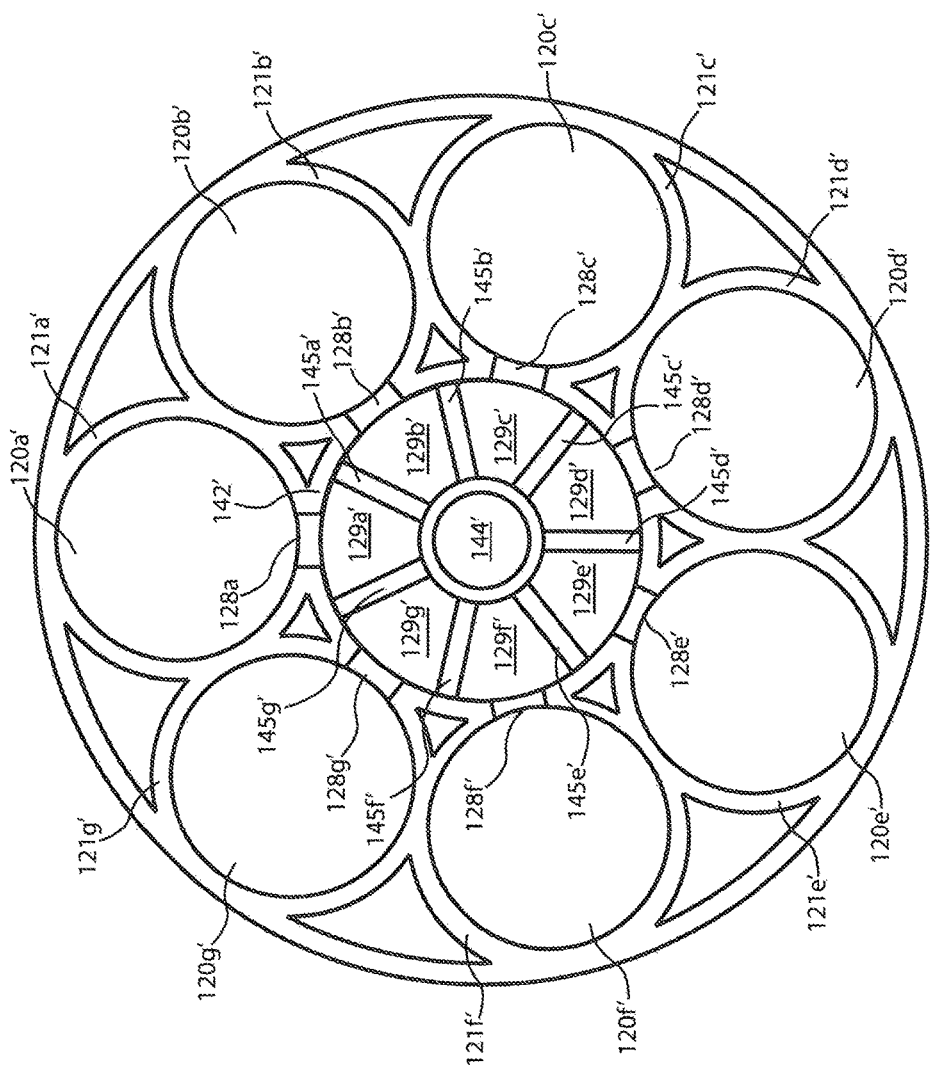

CYCLONE ASSEMBLY FOR SURFACE CLEANING APPARATUS AND A SURFACE CLEANING APPARATUS HAVING SAME

CROSS REFERENCE TO RELATED APPLICATIONS

This application is a continuation-in-part of U.S. patent application Ser. No. 15/137,814, filed on Apr. 25, 2016, which is still pending, the disclosure of which is incorporated herein by reference in its entirety.

FIELD

This disclosure relates generally to cyclone assemblies for surface cleaning apparatus, and more specifically to cyclone assemblies that have first and second cyclonic cleaning stages.

INTRODUCTION

Various types of surface cleaning apparatus are known, including upright surface cleaning apparatus, canister surface cleaning apparatus, stick surface cleaning apparatus, hand carriable surface cleaning apparatus, and central vacuum systems.

Surface cleaning apparatus that use one or more cyclonic cleaning stages to remove particulate matter (e.g. dust and dirt) from an airstream are known.

A second cyclonic cleaning stage, which may comprise a plurality of cyclones in parallel, may be provided downstream of a first cyclonic cleaning stage and upstream of the suction motor. The second cyclonic cleaning stage is typically provided to remove particulate matter from the airstream exiting the first cyclonic cleaning stage and was not removed from the airstream by the first cyclonic cleaning stage.

Typically, second stage cyclones are effective at removing additional particulate matter from the airstream. However, a pre-motor filter is often provided downstream of the first cyclonic cleaning stage and upstream of the suction motor to protect the suction motor by filtering out particulate matter from the airstream that was not removed from the airstream by either the first or second cyclonic cleaning stage. However, there may be one or more disadvantages associated with providing a pre-motor filter. For example, the pre-motor filter may become clogged with particulate matter, requiring a user to clean and/or replace the filter, a task a user may regard as undesirable.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, a cyclone assembly that may be used as an air treatment member to remove particulate matter (e.g. dirt, dust) from an airflow includes a first cyclonic cleaning stage and a second cyclonic cleaning stage located downstream of the first cyclonic cleaning stage wherein the second cyclonic cleaning stage includes a greater number of cyclone chambers than the first cyclonic cleaning stage. The first and second cyclonic stages are configured to provide reduced back pressure caused by air flow through the cyclonic stages. To this end, the cyclone chambers of the second cyclonic cleaning stage may be taller than the cyclone stage(s) of the first cyclonic cleaning stage.

In order to reduce backpressure through such a cyclone assembly, it is preferred that the velocity of the airflow entering the first cyclonic cleaning stage is approximately equal to the velocity of the airflow entering the second cyclonic cleaning stage. While the airflow velocity through the first stage air inlet is preferably approximately equal to the airflow velocity through each of the second stage air inlets, the separation characteristics of the first and second cyclonic cleaning stages may nonetheless be different. For example, if a second stage cyclone chamber has a smaller radius than the first stage cyclone chamber, particles entrained in the airflow in the second stage cyclone will experience a greater centrifugal force than they experienced in the first stage cyclone, which may promote the disentrainment of smaller particles from the airflow in the second cyclonic cleaning stage.

In an effort to achieve relatively equal airflow velocities (e.g., ±25%, ±20%, ±15%, ±10%, ±5%, the total cross-sectional area of the air inlet(s) of the first cyclonic cleaning stage is preferably approximately equal to the total cross-sectional area of the second stage air inlets (i.e. the sum of the cross-sectional areas of each second stage cyclone chamber air inlet). If the first cyclonic cleaning stage comprises a single cyclone chamber, then the total cross-sectional area of the air inlet of the first cyclonic cleaning stage is preferably approximately equal to the total cross-sectional area of the second stage air inlets.

However, due to boundary layer effects at the perimeter, the effective cross-sectional area of an air inlet may be smaller than the physical dimensions of the inlet. For example, for a rectangular air inlet of height H, width W, and assuming a constant boundary layer thickness $L_B$, the effective cross sectional area for the inlet may be estimated as:

$$\text{Area}_{\textit{Effective}} = (H-(2 \times L_B)) \times (W-(2 \times L_B)) = HW - 2(HL_B + WL_B - 2L_B^2).$$

If the second cyclonic cleaning stage has a larger number of second stage cyclones than the first cyclonic cleaning stage, and therefore a larger number of air inlets, and the sum of the cross sectional areas of the first stage air inlets is equal to the sum of the cross sectional areas of the second stage air inlets, then the sum of the effective cross sectional areas of the first stage air inlets may be less than the sum of the effective cross sectional areas of the second stage air inlets. The reason for this is that the total effective cross-sectional area of the second stage air inlets may be reduced by a greater amount than that of the first stage air inlet(s) as the boundary layer thickness at the perimeter of an inlet is typically not dependent on the area of the inlet. To adjust for this imbalance, the total cross-sectional area of the second stage air inlets, and optionally the cross-sectional area of each second stage air inlet, may be increased by about 5 to 30%, preferably about 10 to 20%, and more preferably by about 15% over what would be required to provide an approximately equal total physical inlet area for the second stage.

Also, it may be assumed that, generally, during each revolution within a cyclone chamber, an air stream moves in the longitudinal direction towards an end of the cyclone chamber by about the height of the cyclone chamber air inlet. For example, in a cyclone chamber that has a longitudinal height that is five times greater than the longitudinal height of its air inlet, the air may be expected to rotate about five times as it travels from the end of the cyclone chamber that has the air inlet to the opposite end of the cyclone chamber.

Accordingly, to provide first and second stage cyclones that have about the same number of turns within their respective cyclone chambers, each cyclone chamber preferably has a similar ratio of the longitudinal height of its air inlet to the longitudinal height of the cyclone chamber. Thus, where the longitudinal height of the air inlet for each second stage cyclone chamber is greater than the longitudinal height of the air inlet for the first stage cyclone chamber, the height of each second stage cyclone chamber is preferably greater than the height of each first stage cyclone chamber.

In accordance with this broad aspect, there is provided a cyclone assembly for a surface cleaning apparatus comprising:

(a) a first cyclonic cleaning stage comprising at least one first stage cyclone having a first stage cyclone chamber, each first stage cyclone having a first stage longitudinal cyclone axis about which the air rotates in the first stage cyclone chamber, each first stage cyclone chamber having a height extending between a first stage cyclone chamber air inlet and a first stage cyclone dirt outlet; and (b) a second cyclonic cleaning stage downstream from the first cyclonic cleaning stage and comprising a plurality of second stage cyclones in parallel, each of the plurality of second stage cyclones has a second stage cyclone chamber having a second stage longitudinal cyclone axis about which the air rotates in the second stage cyclone chamber, each second stage cyclone chamber having a height extending between a second stage cyclone chamber air inlet and a second stage cyclone dirt outlet, wherein the second cyclonic cleaning stage has a larger number of second stage cyclones than the first cyclonic cleaning stage, and wherein the height of each second stage cyclone chamber is greater than the height of each first stage cyclone chamber.

In some embodiments, the second stage cyclone dirt outlets may be provided in sidewalls of the second stage cyclones.

In some embodiments, the first and second stage longitudinal cyclone axes may be generally parallel.

In some embodiments, the first and second stage cyclones may be inverted.

In some embodiments, some or all of the second stage cyclone chamber air inlets may have a height in a direction of the second stage longitudinal cyclone axis that is greater than a height of each first stage cyclone chamber air inlet in a direction of the first stage longitudinal cyclone axis.

In some embodiments, the height of some or all of the second stage cyclone chamber air inlets may be 1.25 to 2.5 times greater than the height of each first stage cyclone chamber air inlet.

In some embodiments, the height of each second stage cyclone chamber may be greater than the height of each first stage cyclone chamber by at least the height of the first stage cyclone chamber air inlet. Optionally, in some embodiments, each of the second stage cyclone chamber air inlets may have a height in a direction of the second stage longitudinal cyclone axis that is 1.25 to 2.5 times greater than a height of each first stage cyclone chamber air inlet in a direction of the first stage longitudinal cyclone axis.

In some embodiments, each of the second stage cyclone chamber air inlets may have a width in a direction transverse to the second stage longitudinal cyclone axis according to the following formula: $W_2=W_1/N\pm15\%$, wherein $W_2$ is the width of the second stage cyclone inlets in a direction transverse to the second stage longitudinal cyclone axis; $W_1$ is the width of the first stage cyclone inlets in a direction transverse to the first stage longitudinal cyclone axis; and, N is the number of second stage cyclones. Optionally, in some embodiments, some or all of the second stage cyclone chamber air inlets may have a height in a direction of the second stage longitudinal cyclone axis that is greater than a height of the first stage cyclone chamber air inlet in a direction of the first stage longitudinal cyclone axis. Optionally, in some embodiments, the height of some or all the second stage cyclone chamber air inlets may be 1.25 to 2.5 times greater than the height of the first stage cyclone chamber air inlet.

In some embodiments, each of the first and second stage cyclone chamber air inlets may have a cross sectional area and a total of the cross sectional areas of the second stage cyclone chamber air inlets may be greater than a total of the cross sectional area of the first stage cyclone chamber air inlets.

In some embodiments, the total of the cross sectional areas of the second stage cyclone chamber air inlets may be 1.1-2, 1.1-1.5 or 1.1-1.3 times greater than the total of the cross sectional area of the first stage cyclone chamber air inlets.

In some embodiments, each of the first and second stage cyclone chamber air inlets has a cross sectional area and a total of the cross sectional areas of the second stage cyclone chamber air inlets may be greater than a total of the cross sectional area of the first stage cyclone chamber air inlets.

In some embodiments, each of the first and second stage cyclone chambers has a cyclone chamber air outlet and each cyclone chamber air outlet has a cross sectional area and a total of the cross sectional areas of the second stage cyclone chamber air outlets may be greater than a total of the cross sectional area of the first stage cyclone chamber air outlets.

In some embodiments, the total of the cross sectional areas of the second stage cyclone chamber air outlets may be 1.1-2, 1.1-1.5 or 1.1-1.3 times greater than the total of the cross sectional area of the first stage cyclone chamber air outlets.

In some embodiments, the height of each first stage cyclone chamber may be selected such that air rotates 2-4 times in each first stage cyclone chamber and the height of each second stage cyclone chamber may be selected such that air rotates 2-4 times in each second stage cyclone chamber.

In some embodiments, the height of each first and second stage cyclone chamber may be selected such that air rotates about 3 times in each cyclone chamber.

In accordance with another aspect of this disclosure, at least a portion of, and preferably most or substantially all of a second stage dirt collection region may be positioned longitudinally above and overlying the first stage cyclone chamber. Providing the second stage dirt collection region in such a location may facilitate a more compact design of a two stage cyclone assembly.

In accordance with this broad aspect, there is provided a cyclone assembly for a surface cleaning apparatus comprising:

(a) a first cyclonic cleaning stage comprising at least one first stage inverted cyclone having a first stage cyclone chamber and an upper end;

(b) a second cyclonic cleaning stage downstream from the first cyclonic cleaning stage and comprising a plurality of inverted second stage cyclones in parallel, each of the plurality of second stage cyclones has a second stage cyclone chamber, wherein the second cyclonic cleaning stage comprises a second stage dirt collection region and at least a portion of the second stage dirt collection region is positioned longitudinally above the first stage cyclone chamber and overlying the first stage cyclone chamber.

In some embodiments, the at least a portion of the second stage dirt collection region may be positioned on the upper end.

In some embodiments, the second stage dirt collection region may be external to the second stage cyclones.

In some embodiments, the second stage dirt collection region may comprise a plurality of second stage dirt collection chambers.

In some embodiments, each second stage cyclone chamber has a second stage cyclone dirt outlet, each of which may be provided in a sidewall of one of the second stage cyclones.

In some embodiments, the first cyclonic cleaning stage has a first stage dirt collection region that may be external to the at least one first stage inverted cyclone and each first stage cyclone chamber has a first stage cyclone dirt outlet which may be provided in a sidewall of the at least one first stage inverted cyclone.

In some embodiments, the cyclone assembly may further comprise an openable lid which closes an upper end of the second stage cyclones and the second stage dirt collection region wherein when the openable lid is in an open position, the upper end of the second stage cyclones and the second stage dirt collection region may be opened.

In some embodiments, the first cyclonic cleaning stage has a first stage dirt collection region that may be external to the at least one first stage inverted cyclone and the cyclone bin assembly has an upper end comprising the second stage dirt collection region and the upper end may be moveably to an open position in which the at least one first stage inverted cyclone and the first stage dirt collection region are open.

In some embodiments, when the upper end is in the open position the second stage dirt collection region may be closed.

In some embodiments, when the upper end is in the open position the second stage cyclones may also be opened.

In some embodiments, the cyclone assembly further comprises an openable lid which may close an upper end of the second stage dirt collection region wherein when the openable lid is in an open position, the upper end of the second stage dirt collection region may be opened and the openable lid may be openable when the upper end is in the open position.

In some embodiments, when the upper end comprises an upper openable lid which closes an upper end of the second stage dirt collection region and a lower wall, the lower wall may comprise an upper end wall of the at least one first stage inverted cyclone.

In accordance with another aspect of this disclosure, an upstream pre-motor filter chamber or manifold may be positioned facing, e.g., below, the second cyclonic cleaning stage and each of the second stage cyclone air outlets may have an outlet extend to an opening in a wall of the chamber or manifold. An advantage of this design is that fewer conduit walls and/or ducting may be required to direct airflow from the second cyclonic cleaning stage towards the pre-motor filter, which may simplify the design and/or construction of the cyclone assembly and/or surface cleaning apparatus, and/or may reduce backpressure through the surface cleaning apparatus.

In accordance with this broad aspect, there is provided a cyclone assembly for a surface cleaning apparatus comprising:
(a) a first cyclonic cleaning stage comprising at least one first stage cyclone, which may be an inverted cyclone, having a first stage cyclone chamber and a first stage cyclone air outlet;
(b) a second cyclonic cleaning stage downstream from the first cyclonic cleaning stage and comprising a plurality of second stage cyclones in parallel, each of the plurality of second stage cyclones may be an inverted cyclone and may each have a second stage cyclone chamber, each of the second stage cyclones having a second stage cyclone air outlet; and
(c) a pre-motor filter chamber, which may be positioned below the second cyclonic cleaning stage, wherein each of the second stage cyclone air outlets has an outlet end in a wall forming an upstream pre-motor filter chamber.

In some embodiments, the second cyclonic cleaning stage may be removable from the pre-motor filter chamber.

In some embodiments, the second cyclonic cleaning may have an openable bottom wall wherein the second stage cyclones are opened when the openable bottom wall is in an open position.

In some embodiments, the first cyclonic cleaning stage may have a first stage dirt collection region that is external to the at least one first stage inverted cyclone and the first stage dirt collection region may be opened when the openable bottom wall is in an open position.

In some embodiments, the second cyclonic cleaning stage may comprise a second stage dirt collection region and the cyclone assembly may further comprise an openable lid which closes an upper end of the second stage dirt collection region wherein when the openable lid is in an open position, the upper end of the second stage dirt collection region may be opened.

In some embodiments, the cyclone assembly may further comprise a header downstream of the first stage cyclone air outlet and upstream of the second stage cyclones wherein the header is positioned between the first the first stage cyclone air outlet and the pre-motor filter chamber.

In some embodiments, the second cyclonic cleaning may have an openable bottom wall wherein the second stage cyclones and the header are opened when the openable bottom wall is in an open position.

In some embodiments, the first cyclonic cleaning stage may have a first stage dirt collection region that is external to the at least one first stage inverted cyclone and the first stage dirt collection region may be opened when the openable bottom wall is in an open position.

In accordance with another aspect of this disclosure, a release mechanism may be provided which is moveable to two open positions wherein, in a first open position, a first lock is moved to an unlocked position and in a second open position, a second lock is moved to an unlocked position. An advantage of this design is that the same actuator may be used to unlock an upper end of a cyclone assembly that houses a second stage dirt collection area and to open an upper lid that opens the second stage dirt collection area.

In accordance with another aspect of this disclosure, a compact cyclone assembly which has two cyclonic stages, and may have reduced backpressure thereacross, is provided. In accordance with this aspect, a cyclone assembly may have first and second cyclonic stages wherein the inlet to the cyclones of the second cyclonic stage are proximate to the outlet of a single cyclone of the first cyclonic stage (e.g., axially spaced and radially spaced therefrom). The dirt collection region for the second stage cyclone may be centrally located (e.g., a plurality of second stage cyclones may surround the dirt collection region). Accordingly, the dirt collection region may be axially spaced from the outlet of a single cyclone of the first cyclonic stage and a header upstream from the air inlets of the cyclones of the second cyclonic stage may be provided between the dirt collection region and the outlet of a single cyclone of the first cyclonic stage. An advantage of this design is that air may exit the first cyclonic stage and directly enter a header for the second cyclonic stage thereby reducing backpressure through the cyclonic assembly. Another advantage is that by placing the second stage dirt collection region centrally between the second stage cyclones, the second stage dirt collection region and the second stage cyclones may be opened concurrently.

In accordance with this broad aspect, there is provided cyclone assembly for a surface cleaning apparatus comprising:

(a) a first cyclonic cleaning stage comprising at least one first stage cyclone having a first stage cyclone chamber and a first stage dirt collection chamber external to the cyclone chamber, the first cyclonic cleaning stage having a longitudinal axis and first and second longitudinally spaced apart ends wherein the first end is moveable between a closed position in which the first stage cyclone chamber and the first stage dirt collection chamber are closed and an open position in which the first stage cyclone chamber and the first stage dirt collection chamber are open; and, (b) a second cyclonic cleaning stage downstream from the first cyclonic cleaning stage and comprising a plurality of second stage cyclones in parallel and at least one second stage dirt collection chamber external to the cyclone chambers, wherein each of the plurality of second stage cyclones has a second stage cyclone chamber, the second cyclonic cleaning stage having a longitudinal axis and first and second longitudinally spaced apart ends, wherein the first end of the second cyclonic cleaning stage is proximal to the second end of the first cyclonic cleaning stage and the second end of the second cyclonic cleaning stage is axial spaced from the first end of the second cyclonic cleaning stage, and wherein the second end of the second cyclonic cleaning stage is moveable between a closed position in which the second stage cyclone chambers and the at least one second stage dirt collection chamber are closed and an open position in which the second stage cyclone chambers and the at least one second stage dirt collection chamber are open.

In some embodiments, the at least one second stage dirt collection chamber may be centrally positioned, in a transverse direction, in the second cyclonic cleaning stage.

In some embodiments, the second stage cyclone chambers may be positioned around the at least one second stage dirt collection chamber.

In some embodiments, the at least one second stage dirt collection chamber may comprise a plurality of second stage dirt collection chambers.

In some embodiments, the at least one second stage dirt collection chamber may comprise a single second stage dirt collection chamber.

In some embodiments, the at least one second stage dirt collection chamber may be axially spaced from and facing an air outlet of the first stage cyclone chamber.

In some embodiments, the first end of the second cyclonic cleaning stage may be axially spaced from and face the second end of the first cyclonic cleaning stage.

In some embodiments, the first stage cyclone chamber may have a side wall dirt outlet.

In some embodiments, the first stage cyclone chamber may have an air outlet at the second end of the first cyclonic cleaning stage and the dirt outlet may be provided at the second end of the first cyclonic cleaning stage.

In some embodiments, the first stage cyclone chamber may have an air inlet at the second end of the first cyclonic cleaning stage.

In some embodiments, the second stage cyclone chambers may have air inlets at the first end of the second cyclonic cleaning stage.

In some embodiments, the second stage cyclone chambers may have air outlets at the second end of the second cyclonic cleaning stage.

In some embodiments, the air inlets of the second stage cyclone chambers may be centrally positioned, in a transverse direction.

In some embodiments, the air inlets of the second stage cyclone chambers may be axially spaced from and face an air outlet of the first cyclonic cleaning stage.

In some embodiments, the first end of the first cyclonic cleaning stage and the second end of the second cyclonic cleaning stage may be provided at longitudinally opposed ends of the cyclone bin assembly.

In some embodiments, the second stage cyclone chambers may have side wall dirt outlets.

In some embodiments, the second stage cyclone chambers may have air outlets at the second end of the second cyclonic cleaning stage and the dirt outlets may be provided at the second end of the second cyclonic cleaning stage.

In some embodiments, the first stage cyclone chamber may have an air outlet at the second end of the first cyclonic cleaning stage and the first stage cyclone chamber may have a dirt outlet provided at the second end of the first cyclonic cleaning stage and wherein the second stage cyclone chambers may have air outlets at the second end of the second cyclonic cleaning stage and the second stage cyclone chambers may have dirt outlets provided at the second end of the second cyclonic cleaning stage.

In some embodiments, the second stage cyclone chambers may have air inlets at the first end of the second cyclonic cleaning stage.

In some embodiments, the air inlets of the second stage cyclone chambers may be centrally positioned, in a transverse direction.

A pre-motor filter is typically provided downstream of the cyclonic cleaning stages and upstream of the suction motor, to prevent particulate matter that is not removed from the airstream by the cyclonic cleaning stages from being drawn into the suction motor. Otherwise, this unremoved particulate matter may cause damage to (or otherwise impair) the suction motor. While the use of a pre-motor filter may be effective at protecting the suction motor, there may be one or more disadvantages. For example, the pre-motor filter may become clogged with particulate matter, requiring a user to clean and/or replace the filter, a task a user may regard as undesirable.

In some embodiments disclosed herein, all or substantially all of the dirt entrained in the air exiting the first cyclonic cleaning stage may be removed from the airflow by the second cyclonic cleaning stage. This may, for example, obviate the need to provide a pre-motor filter in the surface cleaning apparatus.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
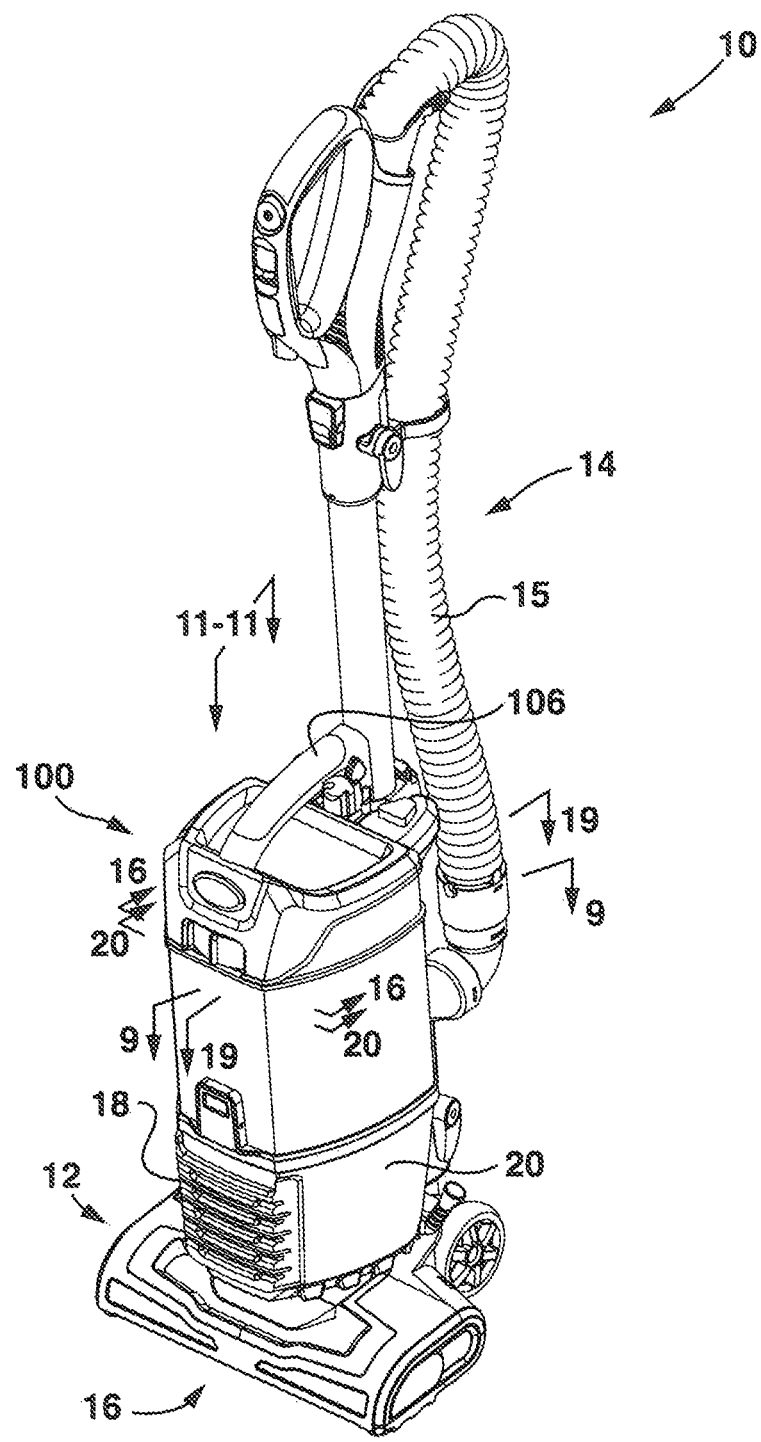
FIG. 1 is a perspective view of a surface cleaning apparatus comprising a cyclone assembly in accordance with one embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

In the examples discussed herein, the surface cleaning apparatus with which the cyclone assembly is used is an upright vacuum cleaner. In alternative embodiments, the surface cleaning apparatus may be another suitable type of surface cleaning apparatus, such as a canister type vacuum cleaner, a hand vacuum cleaner, a stick vac, a wet-dry type vacuum cleaner, a carpet extractor, and the like.

General Description of a Surface Cleaning Apparatus

Referring to FIG. 1, a surface cleaning apparatus is shown generally as 10. The surface cleaning apparatus includes a surface cleaning head 12 and an upper portion 14 that is movably and drivingly connected to the surface cleaning head 12. The surface cleaning head 12 may be supported by any suitable support members, such as, for example wheels and/or rollers, to allow the surface cleaning head to be moved across a floor or other surface being cleaned. The support members (e.g., wheels) may be of any suitable configuration, and may be attached to any suitable part of the surface cleaning apparatus, including, for example, the surface cleaning head and/or the upper portion.

Figure 9:
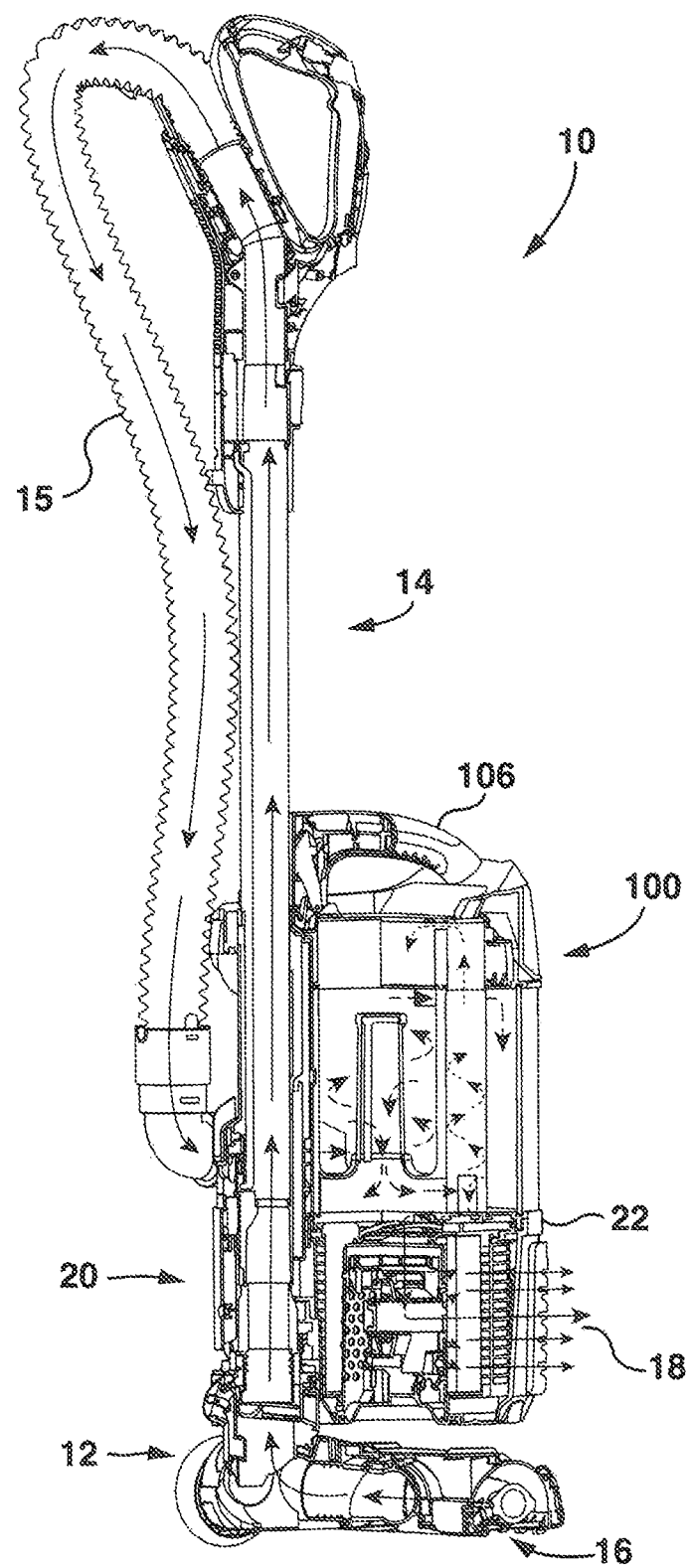
FIG. 9 is a cross-section view of the surface cleaning apparatus of FIG. 1.
Figure 10:
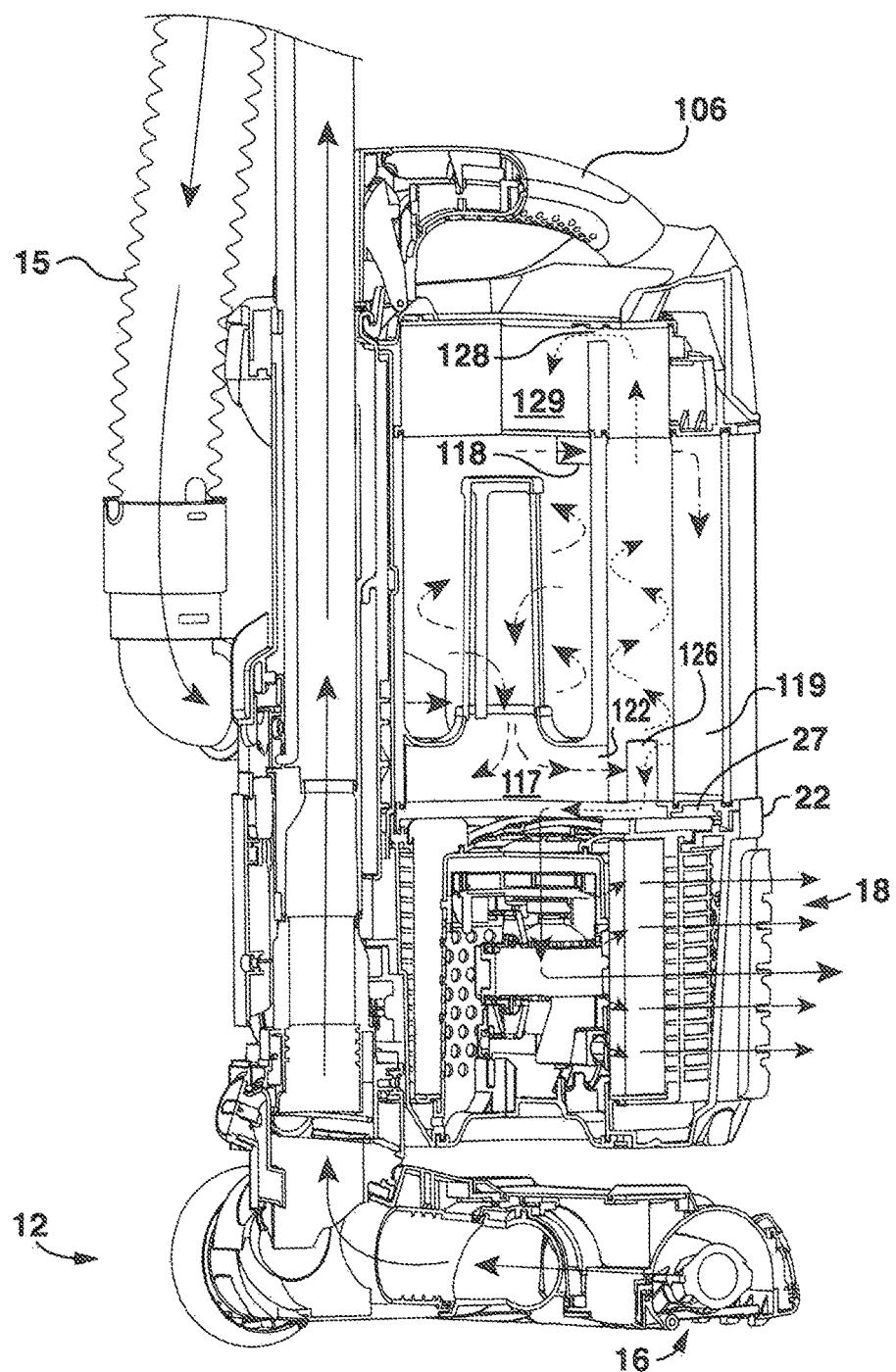
FIG. 10 is an enlarged view of the lower portion of FIG. 9.
Figure 11:
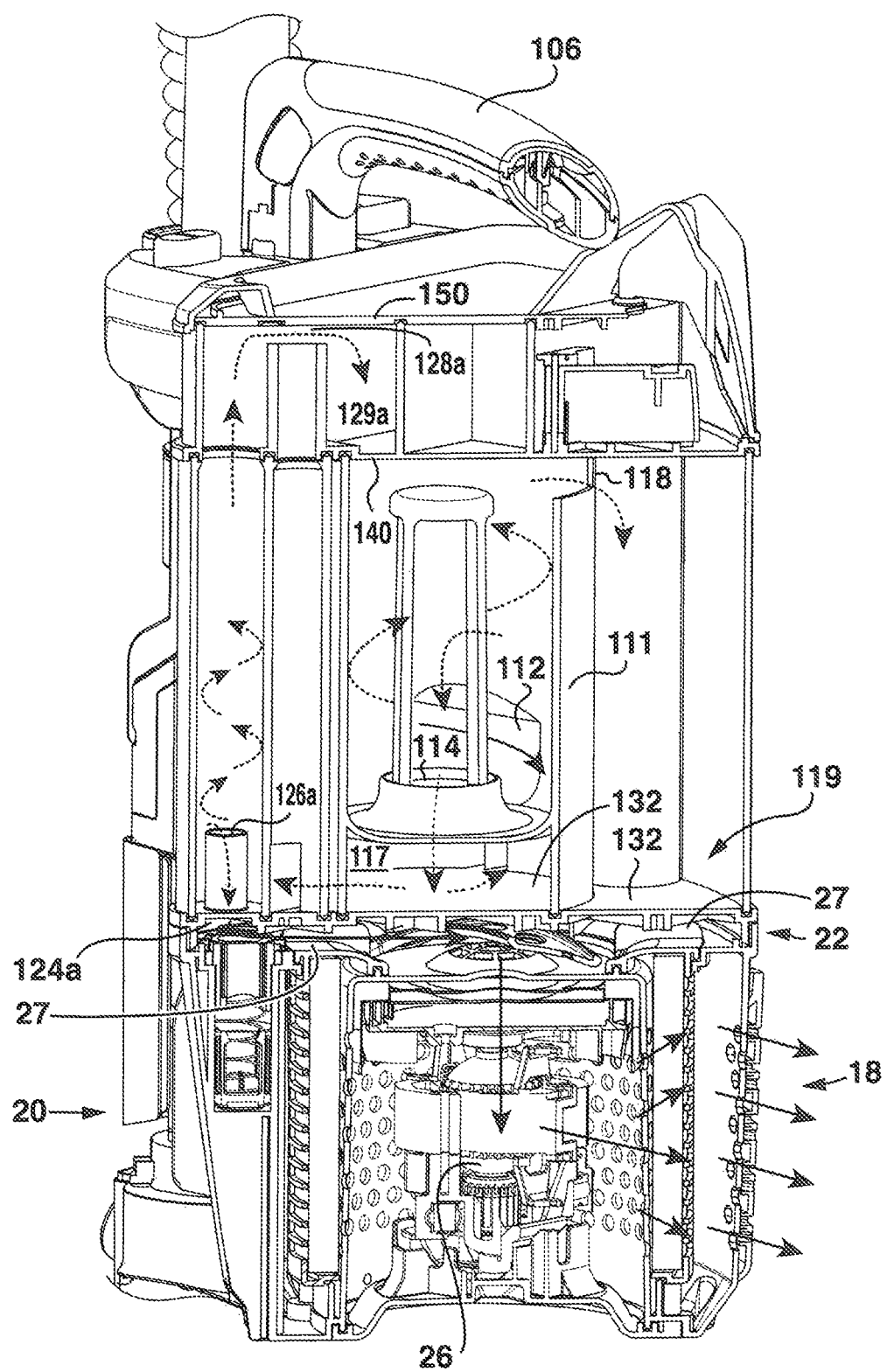
FIG. 11 is a section view of the cyclone assembly and suction motor housing of the surface cleaning apparatus of FIG. 8, taken along line 11-11 shown in FIG. 1.

The surface cleaning apparatus 10 includes a dirty air inlet 16, a clean air outlet 18 and an air flow path or passage extending therebetween (See FIGS. 9-11). In the illustrated example, the air flow path includes at least one flexible air flow conduit member (such as a hose 15 or other flexible conduit). Alternatively, the air flow path may be formed from rigid members. A cyclone assembly 100 and at least one suction motor are provided in the air flow path. Preferably, the cyclone assembly is provided upstream from a suction unit 20 that contains the suction motor(s), but alternatively may be provided downstream from the suction motor(s). In addition to the cyclone assembly, the surface cleaning apparatus may also include one or more pre-motor filters (preferably positioned in the air flow path between the cyclone assembly and the suction motor) and/or one or more post-motor filters (positioned in the air flow path between the suction motor and the clean air outlet).

General Description of a Cyclone Assembly

FIGS. 2-8 and 12-15 illustrate an embodiment of a cyclone assembly, referred to generally as 100. Cyclone assembly 100 may be used as an air treatment member to remove particulate matter (e.g. dirt, dust) from an air flow. Preferably, the cyclone assembly is removable from the surface cleaning apparatus. Providing a detachable cyclone assembly 100 may allow a user to carry the cyclone assembly 100 to a garbage can for emptying, without needing to carry or move the rest of the surface cleaning apparatus 10. Preferably, the cyclone assembly is removable as a closed module, which may help prevent dirt and debris from spilling out of the cyclone assembly 100 during transport.

Figure 2:
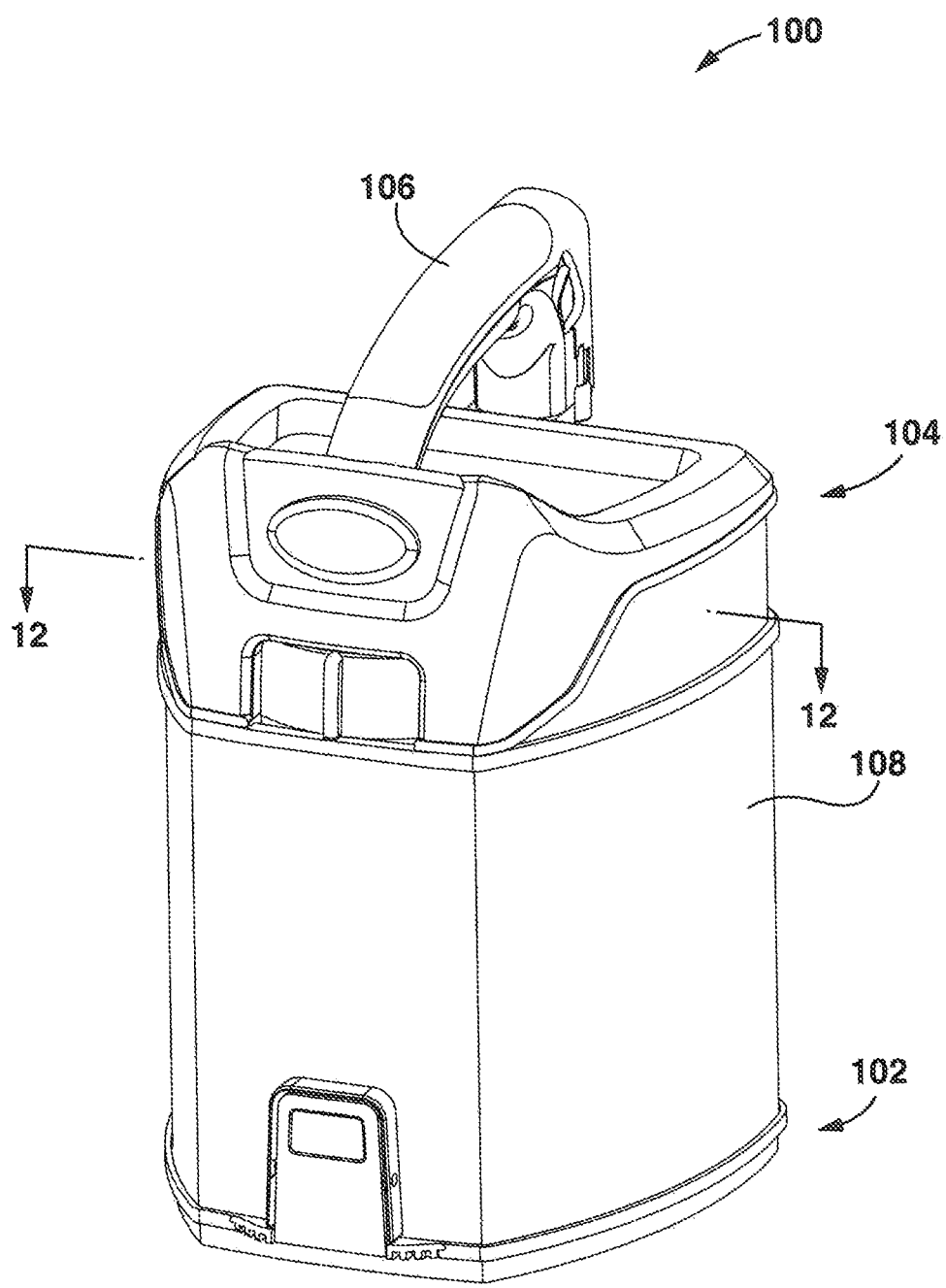
FIG. 2 is a perspective view of the cyclone assembly of FIG. 1.
Figure 3:
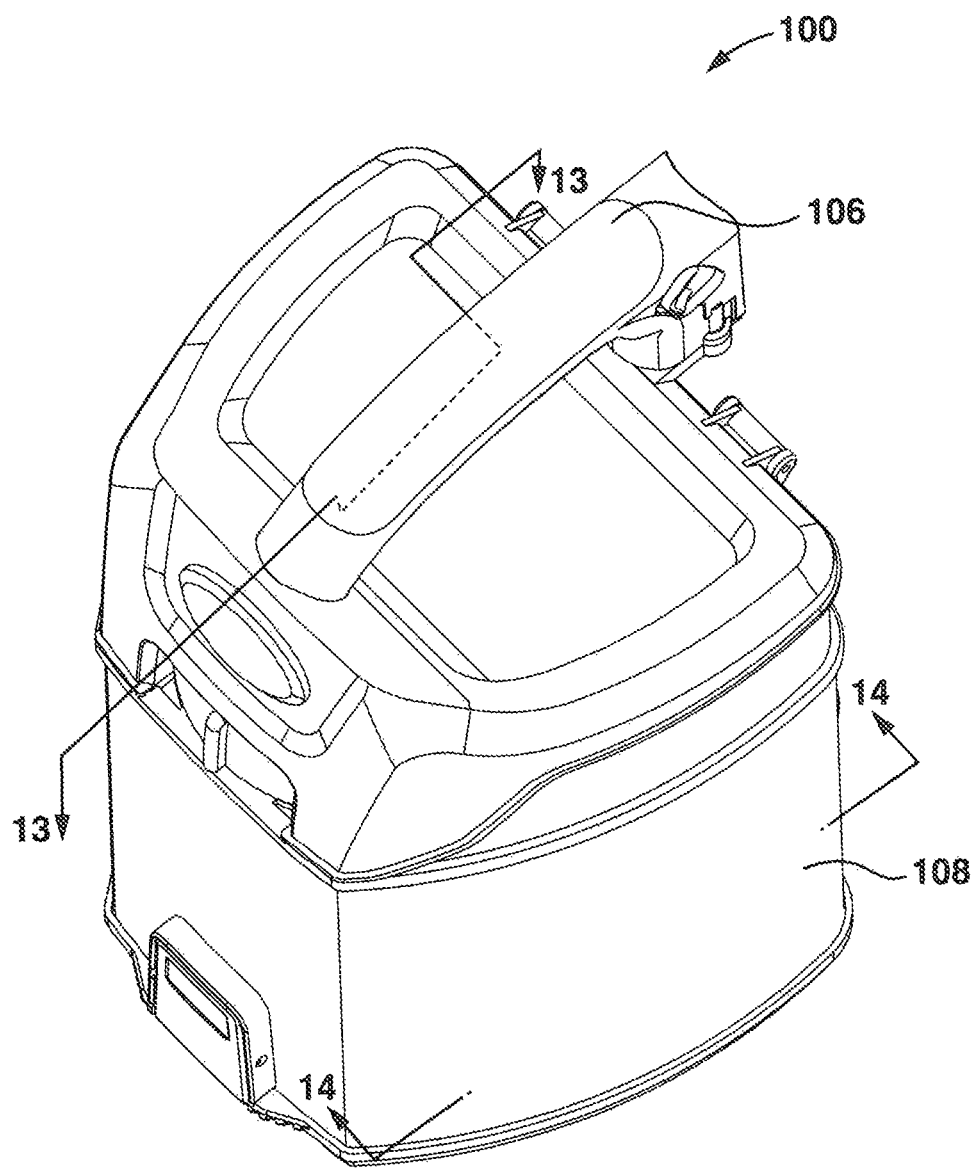
FIG. 3 is a top perspective view of the cyclone assembly of FIG. 2.

As shown in FIG. 2, the cyclone assembly 100 has a lower end 102, an upper end 104, and an outer sidewall 108. Preferably, an assembly handle 106 is provided at the upper end 104. The assembly handle 106 may facilitate carrying of the cyclone assembly when it is detached from the surface cleaning apparatus 10.

Referring to FIGS. 4-8 and 12-15, cyclone assembly 100 includes a first cyclonic cleaning stage and a second cyclonic cleaning stage located downstream of the first cyclonic cleaning stage. The first cyclonic cleaning stage includes a first stage cyclone chamber 110 that extends along a cyclone axis 115 and includes a generally cylindrical sidewall 111 extending between a lower end wall 113 and an intermediate wall 140 (which is an upper end wall of the cyclone chamber 110). In the illustrated embodiment, the first stage cyclone chamber 110 is arranged in a generally vertical, inverted cyclone orientation. Alternatively, the first stage cyclone chamber can be provided in another orientation, for example as a horizontal or inclined cyclone and may be of any cyclone construction. Alternately, or in addition, the first cyclonic cleaning stage may comprise a plurality of cyclone chambers.

In the illustrated embodiment, the first stage cyclone chamber 110 includes a first stage cyclone air inlet 112 and a first stage cyclone air outlet 114.

First stage cyclone chamber 110 also includes at least one dirt outlet 118, through which dirt and debris that is separated from the air flow can exit the cyclone chamber 110. While it is preferred that most or all of the dirt exit the first stage cyclone chamber via the dirt outlet 118, some dirt may settle on the bottom end wall 113 of the cyclone chamber 110 and/or may be entrained in the air exiting the first stage cyclone chamber via the air outlet 114.

In the illustrated example, the first stage cyclone dirt outlet 118 is in the form of a slot bounded by the cyclone side wall 111 and the upper cyclone end wall 140, and is located toward the upper end of the cyclone chamber 110. Alternatively, the dirt outlet may be of any other suitable configuration, and may be provided at another location in the cyclone chamber, including, for example as an annular gap between the sidewall and an end wall of the cyclone chamber or an arrestor plate or other suitable member.

Preferably, the first stage cyclone air inlet 112 is located toward one end of the cyclone chamber 110 (the lower end in the illustrated example) and may be positioned adjacent the corresponding cyclone chamber end wall 113. Alternatively, the cyclone air inlet 112 may be provided at another location within the first stage cyclone chamber 110. Preferably, the air inlet 112 is positioned so that air flowing through the inlet and into the first stage cyclone chamber is travelling generally tangentially relative to, and preferably adjacent, the sidewall 111 of the cyclone chamber 110.

The cross-sectional shape of the air inlet 112 can be any suitable shape. In the illustrated example of FIG. 12, the air inlet has a cross-sectional shape that is generally rectangular (e.g., it has rounded corners and can be referred to as a rounded rectangle) having a height $H_{I_1}$ in the longitudinal direction (i.e. parallel to cyclone axis 115) and a width $W_{I_1}$ in a transverse direction cyclone axis 115. The cross-sectional area of the air inlet 112 can be referred to as the cross-sectional area or flow area of the first stage cyclone air inlet 112. Alternatively, instead of being a rounded rectangle, the cross-sectional shape of the air inlet may be another shape, including, for example, round, oval, square and rectangular.

Figure 12:
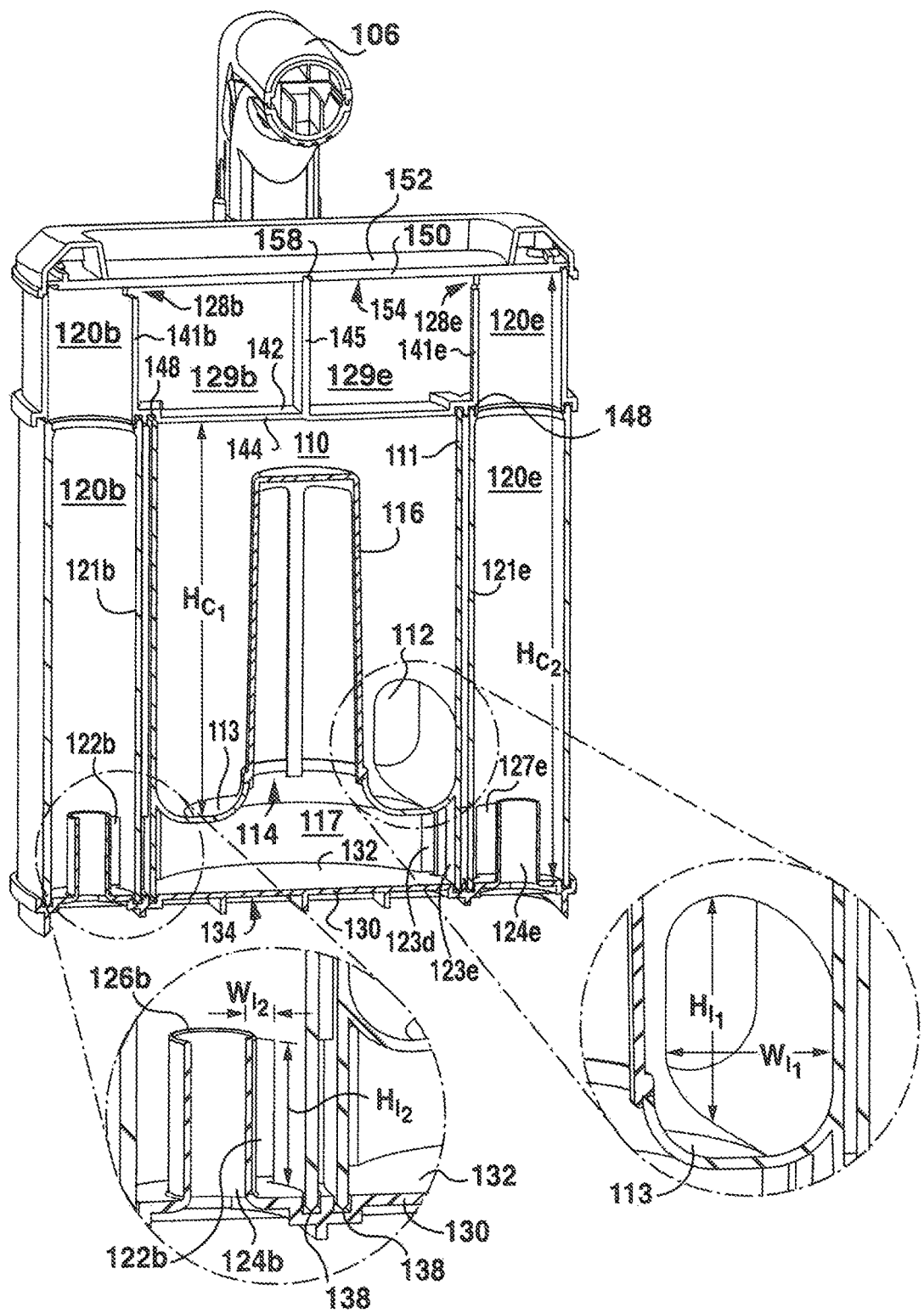
FIG. 12 is a cross-section view of the cyclone assembly of FIG. 2, taken along line 12-12 shown in FIG. 2.

Referring to FIG. 12, the first stage cyclone chamber 110 has a height $H_{C_1}$ in the longitudinal direction (i.e. parallel to cyclone axis 115). The height of the first stage cyclone chamber 110 is preferably selected such that air entering the cyclone chamber via inlet 112 is expected to rotate approximately 3 to 6 times, 3 to 5 times, 2 to 4 times or three-and-a-half times in the first stage cyclone chamber prior to exiting the cyclone chamber via outlet 114.

In general, it may be assumed that the airflow against the cyclone chamber sidewall as it progresses around the cyclone chamber maintains a degree of cohesion, and that during each revolution within a cyclone chamber, an air stream moves in the longitudinal direction towards an end of the cyclone chamber by a distance approximately equal to the height of the cyclone chamber air inlet. For example, in a cyclone chamber that has a longitudinal height that is five times greater than the longitudinal height of its air inlet, the resulting cyclone may be expected to rotate about five times as it travels from the end of the cyclone chamber that has the air inlet to the opposite end of the cyclone chamber.

Thus, in order to promote the formation of a cyclone that is expected to rotate about three-and-a-half times in the first stage cyclone chamber 110, the height $H_{C_1}$ of the first stage cyclone chamber 110 may be between 3 and 4 times, the height $H_{I_1}$ of the first stage cyclone air inlet 112.

Air can exit the first stage cyclone chamber 110 via the first stage air outlet 114. Preferably, the cyclone air outlet is positioned in one of the cyclone chamber end walls and, in the example illustrated, is positioned in the same end as the air inlet 112 and air inlet 112 may be positioned adjacent or at the end wall 113. In the illustrated embodiment the air outlet 114 is generally circular in cross-sectional shape. Preferably, the cross-sectional or flow area of the first stage cyclone air outlet 114 is generally equal to the flow area of the first stage cyclone air inlet 112. In the illustrated example, the cyclone air outlet 114 comprises a vortex finder 116.

Air exiting the first stage air outlet 114 may be directed into a chamber or manifold 117. From there, the air is directed into the second cyclonic cleaning stage. The second cyclonic cleaning stage includes a plurality of second stage cyclone chambers 120 arranged in parallel. In the illustrated embodiment, six second stage cyclone chambers are shown, referred to as 120a, 120b, 120c, 120d, 120e, and 120f, respectively.

In the illustrated embodiment, each second stage cyclone chamber 120 is arranged in a generally vertical, inverted cyclone orientation. Alternatively, the second stage cyclone chambers can be provided in another orientation, for example as horizontal or inclined cyclones and may be of any cyclone construction.

In the illustrated embodiment, each second stage cyclone chamber extends along a respective cyclone axis 125 (see e.g. FIGS. 5 and 13) and extends between a lower end wall or bottom 130 and an upper end wall 150. In the illustrated embodiment, each second stage cyclone chamber is bounded by a lower sidewall 121 and an upper sidewall extension 141.

In the illustrated embodiment, each second stage cyclone chamber 120 includes a second stage cyclone air inlet 122 and a second stage cyclone air outlet 124. Each second stage cyclone chamber 120 also includes at least one dirt outlet 128, through which dirt and debris that is separated from the air flow can exit the cyclone chamber 120. While it is preferred that most or all of the dirt entrained in the air exiting the first cyclonic cleaning stage exits the second stage cyclone chambers via the dirt outlets 128, some dirt may settle on the bottom end wall 130 of the cyclone chambers 120 and/or may be entrained in the air exiting the second stage cyclone chambers via the air outlets 124.

In some embodiments, all or substantially all of the dirt entrained in the air exiting the first cyclonic cleaning stage may be removed from the airflow by the second cyclonic cleaning stage. This may, for example, obviate the need to provide a pre-motor filter in the surface cleaning apparatus 10.

In the illustrated example, each second stage cyclone dirt outlet 128 is in the form of a slot bounded by the cyclone side wall 121 and the upper cyclone end wall 150, and is located toward the upper end of the cyclone chamber 120. Alternatively, the dirt outlet may be of any other suitable configuration, and may be provided at another location in the cyclone chamber, including, for example as an annular gap between the sidewall and an end wall of the cyclone chamber or an arrestor plate or other suitable member.

Preferably, each second stage cyclone air inlet 122 is located toward one end of the cyclone chamber 120 (the lower end in the illustrated example) and may be positioned adjacent the corresponding cyclone chamber end wall 130. Alternatively, the cyclone air inlet 122 may be provided at another location within the second stage cyclone chamber 120. Preferably, each air inlet 122 is positioned so that air flowing through the inlet and into a second stage cyclone chamber is travelling generally tangentially relative to, and preferably adjacent, the sidewall 121 of the cyclone chamber 120.

The cross-sectional shape of the air inlet 122 can be any suitable shape. In the illustrated example each air inlet has a cross-sectional shape that is generally rectangular (rounded rectangular), having a height $H_{I_2}$ in the longitudinal direction (i.e. parallel to cyclone axis 125) and a width $W_{I_2}$ in a transverse direction. The total cross-sectional area of the second stage air inlets (i.e. the sum of the cross-sectional areas of each inlet 122a-f) can be referred to as the total cross-sectional area or total flow area of the second cyclonic cleaning stage.

Referring to FIG. 12, each second stage cyclone chamber 120 has a height $H_{C_2}$ in the longitudinal direction (i.e. parallel to cyclone axis 125). The height of each second stage cyclone chamber 120 is preferably selected such that air entering the cyclone chambers via inlets 122 is expected to rotate approximately 3 to 6 times, 3 to 5 times, 2 to 4 times or three-and-a-half times in each second stage cyclone chamber prior to exiting the cyclone chamber via outlet 124. For example, the height $H_{C_2}$ of a second stage cyclone chamber 120 may be between 3 and 4 times, the height $H_{I_2}$ of a second stage cyclone air inlet 122.

Air can exit each second stage cyclone chambers 120 via a second stage air outlet 124 provided for each cyclone chamber 120. Preferably, the cyclone air outlets 124a-f are positioned in one of the end walls of each cyclone chamber 120 and, in the example illustrated, are positioned in the same ends as the air inlets 122a-f. In the illustrated embodiment the air outlets 124a-f are generally circular in cross-sectional shape. Preferably, the cross-sectional or flow area of each second stage cyclone air outlet 124 is generally equal to the flow area of the first stage cyclone air inlet 112 for its respective cyclone chamber. In the illustrated example, each cyclone air outlet 124 comprises a vortex finder 126.

Height of Each Second Stage Cyclone Chamber Greater than the Height of Each First Stage Cyclone Chamber The following is a description of the sizing of a second stage cyclone compared to a first stage cyclone that may be used by itself in any surface cleaning apparatus or in any combination with any other feature or features disclosed herein including the positioning of the dirt collection region for second stage cyclones, a dual opening latching mechanism and the connection of the second stage cyclone chamber air outlets with an upstream chamber of a pre-motor filter.

In order to reduce backpressure through the cyclone assembly 100, it is preferred that the velocity of the airflow entering the first cyclonic cleaning stage is approximately equal to the velocity of the airflow entering the second cyclonic cleaning stage. That is, the airflow velocity through the first stage cyclone air inlet 112 may be approximately equal to the airflow velocity through each of the second stage cyclone air inlets 122.

In an effort to achieve relatively equal airflow velocities, cyclone assembly 100 may be dimensioned so that the total cross-sectional area of the air inlet for the first cyclonic cleaning stage (i.e. the cross-sectional area of the air inlet 112 in the illustrated example) is approximately equal to the total cross-sectional area of the second stage air inlets (i.e. the sum of the cross-sectional areas of each inlet 122a-f).

However, due to boundary layer effects at the perimeter of the inlet, the effective cross-sectional area of each air inlet 112, 122 may be smaller than the physical dimensions of the inlet. For example, a boundary layer having a thickness of about 0.005 to 0.010 inches may form around the perimeter of each air inlet, reducing the effective cross-sectional or flow area of that inlet. For example, for a rectangular air inlet of height H, width W, and assuming a constant boundary layer $L_B$, the effective cross sectional area for the inlet may be estimated as:

$$Area_{Effective}=(H-(2\times L_B))\times(W-(2\times L_B))=HW-2(HL_B+WL_B-2L_B^2).$$

Where the second cyclonic cleaning stage has a larger number of second stage cyclones than the first cyclonic cleaning stage, as in the illustrated example, the total effective cross-sectional area of the second stage air inlets 122 may be reduced by a greater amount than that of the first stage air inlet 112 (as the boundary layer thickness at the perimeter of an inlet is typically not dependent on the area of the inlet). To adjust for this imbalance, the cross-sectional area of each second stage air inlet 122 is preferably increased by about 10 to 30%, and more preferably by about 15% over what would be required to provide an approximately equal physical inlet area to air inlet 112. This may be achieved by varying the width and/or height of the second stage air inlets and preferably varying at least the height of the second stage air inlets. For example, the height of the second stage air inlets may be increased by about 10 to 30%, and more preferably by about 15%.

While the airflow velocity through the first stage cyclone air inlet 112 is preferably approximately equal to the airflow velocity through each of the second stage cyclone air inlets 122, the separation characteristics of the first and second cyclonic cleaning stages may nonetheless be different. For example, since the second stage cyclone chambers 120 each have a smaller radius than the first stage cyclone chamber 110, particles entrained in the airflow in the second stage cyclones will experience a greater centrifugal force than they experienced in the first stage cyclone, which may promote the dis-entrainment of smaller particles from the airflow in the second cyclonic cleaning stage.

In accordance with one feature, the height of each second stage cyclone chamber may be greater than the height of the first stage cyclone chamber. An example of such an arrangement is shown in FIGS. 4-6 and 9-13.

Since the second stage cyclone chambers 120 each have a smaller radius than the radius of the first stage cyclone chamber 110, and since the width of an air inlet to a cyclone chamber is preferably a function of the cyclone chamber diameter, each second stage cyclone air inlet 122 preferably has a narrower width than that of the first stage inlet 112. For example, an air stream entering a cyclone chamber may more or less maintain the same width as it travels through the cyclone chamber. Therefore, the radius of a cyclone chamber may be determined based on the width of the air stream (the width of the air inlet) and the width required for the return air steam travelling to the cyclone chamber air outlet (e.g., the width of a vortex finder). Therefore the radius of a cyclone chamber may be approximately equal to the width of the cyclone chamber air inlet, the width of the wall of the vortex finder and half the diameter of the vortex finder.

In certain preferred embodiments, without taking into account the decreased flow area due to boundary layer effects, the width $W_{I_2}$ for each inlet 122a-f may be within about +/−15% of the width $W_{I_1}$ for inlet 112 divided by the number of second stage cyclone chambers. For example, in the illustrated embodiment, there are six second stage cyclone chambers 120a-f, so the width $W_{I_2}$ for each inlet 122a-f is preferably about $$\frac{W_{I_1}}{6}\pm 15\%.$$

As discussed above, the total cross-sectional area of the second stage air inlets (e.g. the sum of the cross-sectional areas of each inlet 122a-f) may be about 10-30% greater than the total cross-sectional area of the first cyclonic cleaning stage (e.g. the cross-sectional area of the air inlet 112), so that the effective flow area of the second cyclonic cleaning stage is approximately equal to the effective flow area of the first cyclonic cleaning stage, after taking boundary layer effects at the air inlets into account.

In order to determine the height $H_{I_2}$ for each inlet 122, the radius of the second stage cyclones may be first determined based on, e.g., the centrifugal forces to be imposed on an air stream travelling therein. The width of the cyclone chamber air inlet 122 may then be determined to be approximately equal to the radial thickness available in the cyclone chamber in which the air stream will rotate. Finally, the height $H_{I_2}$ for each inlet 122 may be determined based on the cross sectional area required to provide a cross-sectional flow area (taking into account boundary layer losses) that is approximately equal to the cross-sectional flow area of the first stage cyclone air inlet (taking into account boundary layer losses).

In certain other preferred embodiments, the height $H_{I_2}$ of each second stage cyclone chamber air inlet 122 is between about 1.25 to 2.5, 1.25 to 2, 1.25 to 1.75 times greater than the height $H_{I_1}$ of the inlet 112.

As noted above, the height $H_{C_2}$ of a second stage cyclone chamber 120 is preferably between 3 to 6, 3 to 5, 3 to 4 and may be about 3.5 times the height $H_{I_2}$ of a second stage cyclone air inlet 122, and the height $H_{C_1}$ of the first stage cyclone chamber 110 is preferably between 3 to 6, 3 to 5, 3 to 4 and may be about 3.5 times the height $H_{I_1}$ of the first stage cyclone air inlet 112. Thus, since the height $H_{I_2}$ for each inlet 122 is preferably greater than $H_{I_1}$, the height $H_{C_2}$ of each second stage cyclone chamber 120 is preferably greater than the height $H_{C_1}$ of the first stage cyclone chamber 110.

It will be appreciated that some of the embodiments disclosed herein may not use any of the features of the second stage cyclone chambers disclosed herein and that, in those embodiments, the second stage cyclone chambers may be of various constructions and that in those embodiments any second stage cyclone chamber known in the art may be used.

Dirt Collection Region for Second Stage Cyclones Positioned Above and Overlying the First Stage Cyclone The following is a description of the positioning of the dirt collection region for second stage cyclones that may be used by itself in any surface cleaning apparatus or in any combination or sub-combination with any other feature or features disclosed herein including the sizing of a second stage cyclone compared to a first stage cyclone, a dual opening latching mechanism and the connection of the second stage cyclone chamber air outlets with an upstream chamber of a pre-motor filter.

In accordance with one feature, at least a portion of, and preferably most or substantially all of a second stage dirt collection region may be positioned longitudinally above and overlying the first stage cyclone chamber. In such an embodiment, this preferred location for the second stage dirt collection region may facilitate a more compact design of the cyclone assembly 100.

Figure 5:
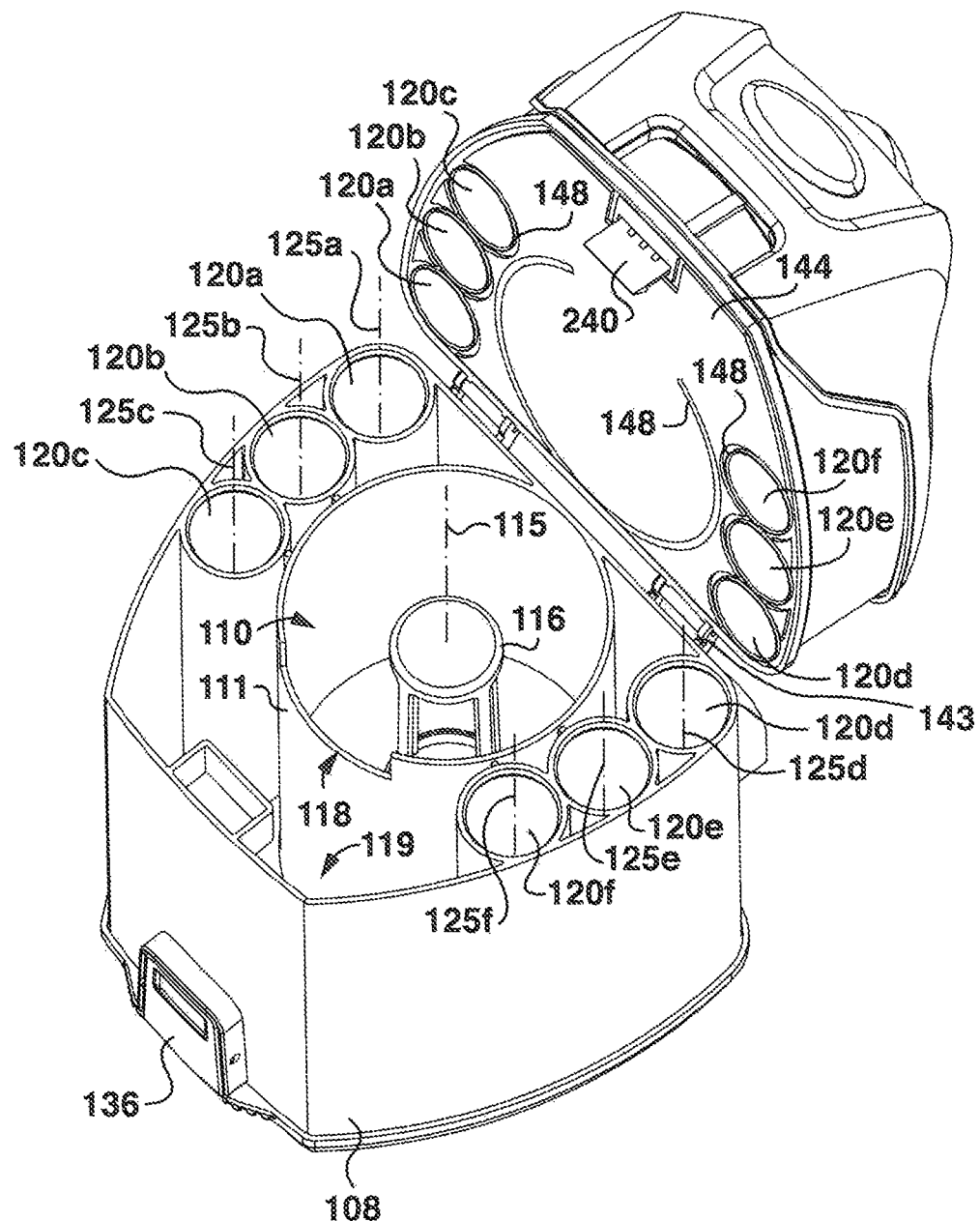
FIG. 5 is a top perspective view of the cyclone assembly of FIG. 2, with an upper end in an open position and the upper lid in a closed position.
Figure 13:
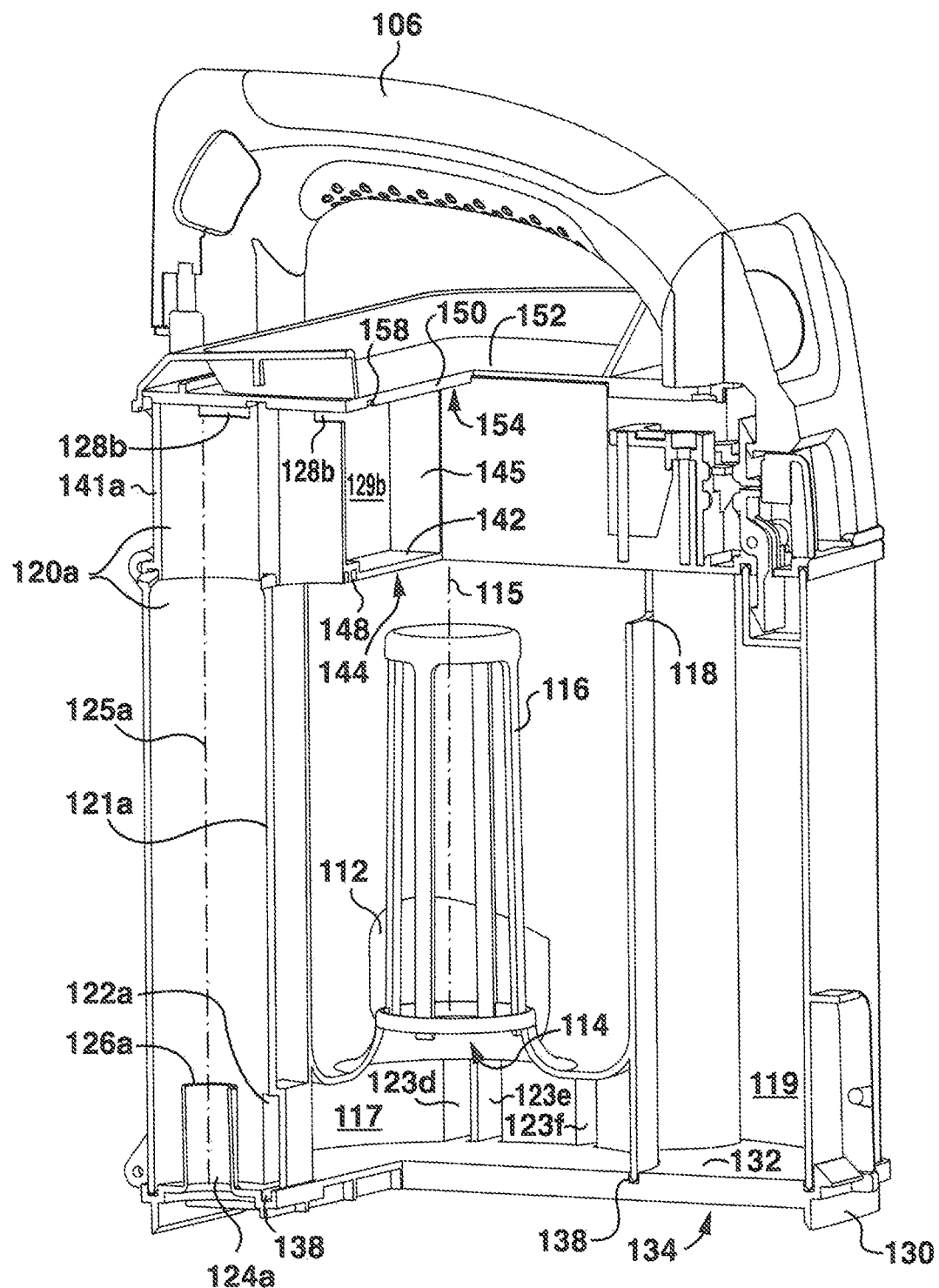
FIG. 13 is a section view of the cyclone assembly of FIG. 2, taken along line 13-13 shown in FIG. 2.
Figure 14:
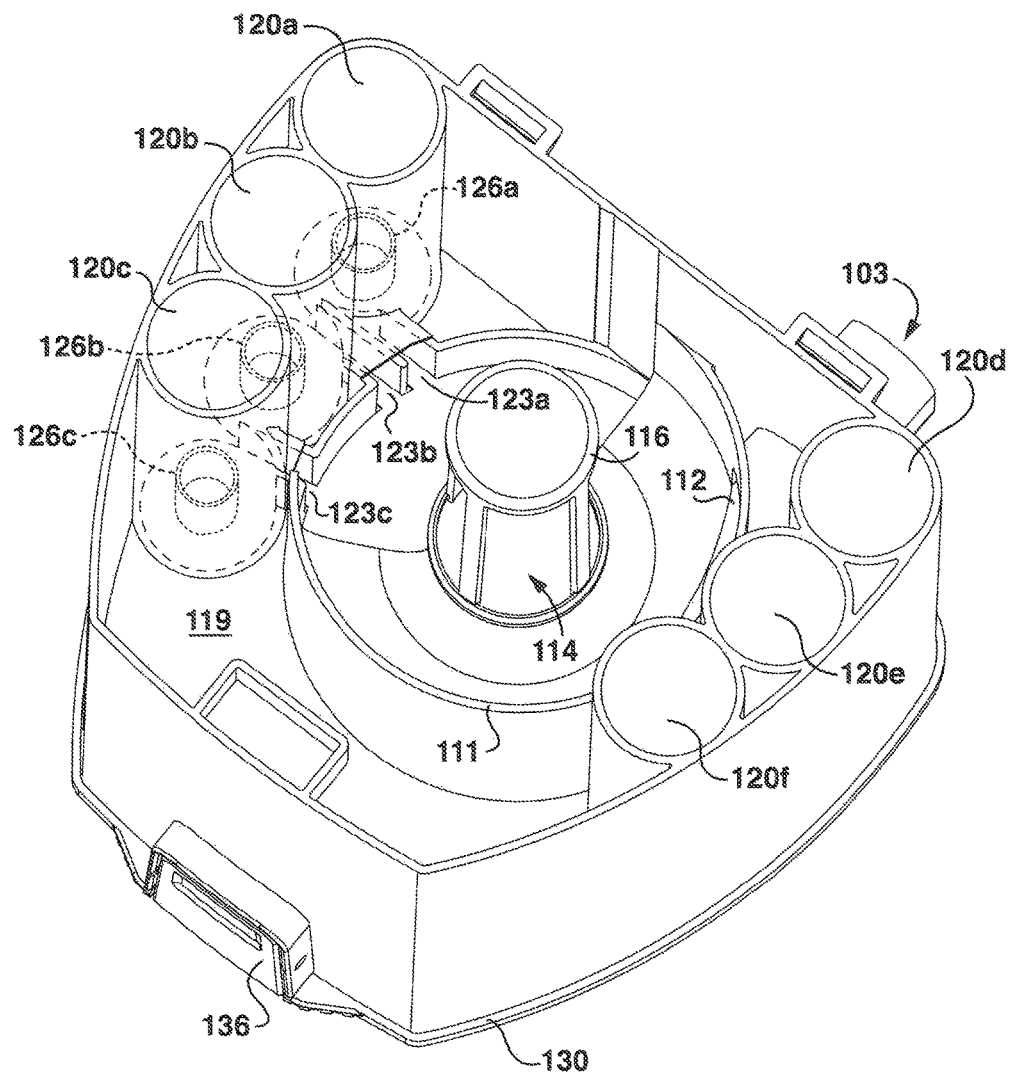
FIG. 14 is a cross-section view of the cyclone assembly of FIG. 2, taken along line 14-14 shown in FIG. 3, with a portion of the lower wall of the first stage cyclone removed to reveal a plurality of second stage cyclone chamber air inlets.

Referring to FIG. 11, a first stage dirt collection chamber 119 is in communication with dirt outlet 118 to collect the dirt and debris as it exits first stage cyclone chamber 110. Dirt collection chamber 119 may be of any suitable configuration. Referring to FIGS. 5 and 13, in the illustrated example, the dirt collection chamber 119 is bounded by outer sidewall 108, first stage cyclone side wall 111, lower end wall 130, and intermediate wall 140.

As shown in FIGS. 9 and 10, in use air enters the first stage cyclone chamber 110 via air inlet 112 and exits the chamber 110 via air outlet 114, while separated dirt and debris exits the cyclone chamber 110 via dirt outlet 118, where it collects in the first stage dirt collection chamber 119.

Figure 8:
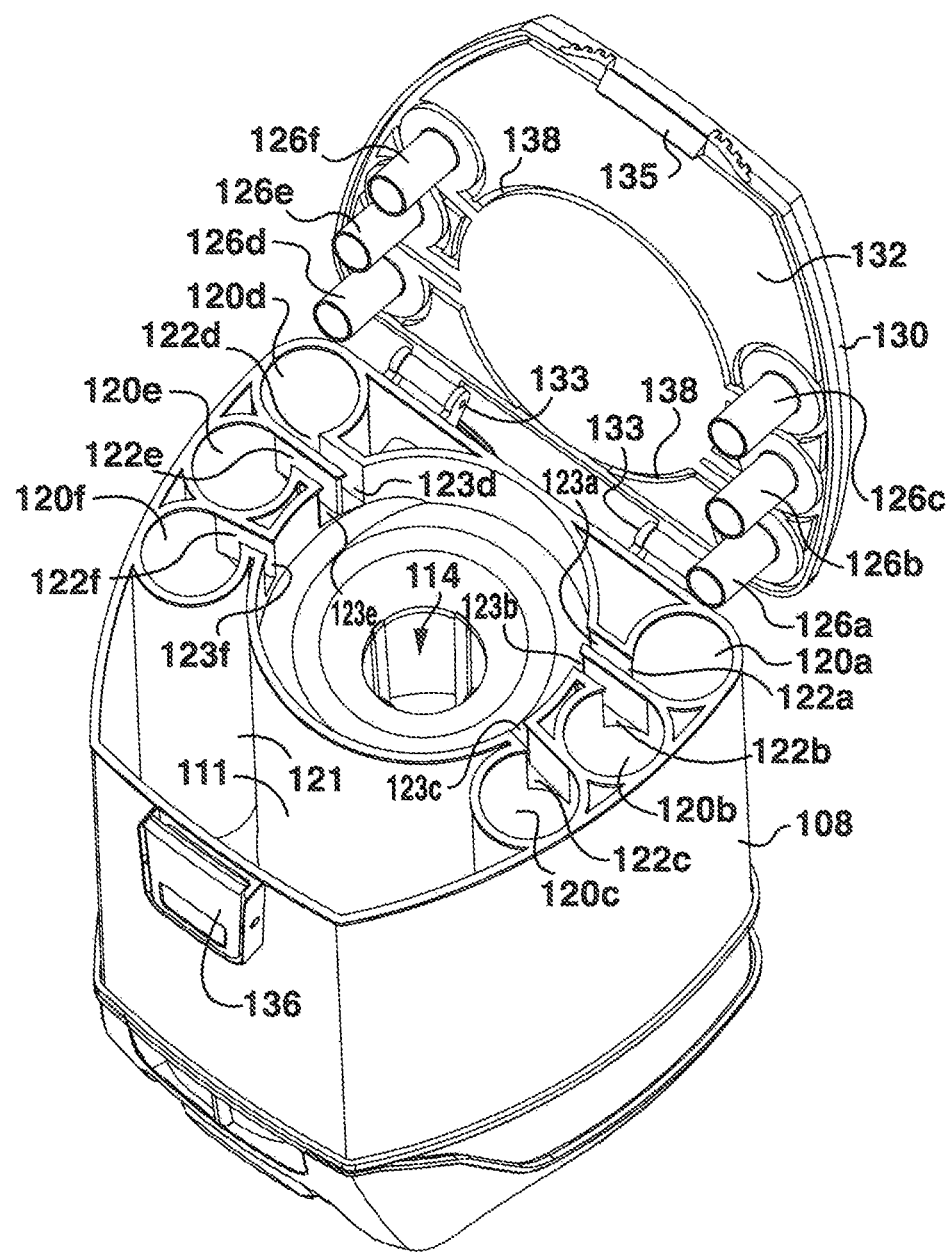
FIG. 8 is a bottom perspective view of the cyclone assembly of FIG. 2, with a bottom in an open position.

To help facilitate emptying the dirt collection chamber 119, at least one of or both of the end walls 130, 140 may be openable. Preferably, end wall 130 is moveable between a closed position (FIG. 13 and FIG. 7) and an open position (FIG. 8). When the end wall 130 is in the open position, the first stage dirt collection chamber 119 and the manifold 117 may be emptied concurrently. In addition, the second cyclone chambers are also opened so that the second cyclone chambers may also be concurrently openable. Optionally, it will be appreciated that the second stage cyclone chambers need not be opened, e.g., if the lower ends of the second stage cyclone chambers are not moveable with end wall 130. Accordingly, the lower end walls of the dirt collection chamber 119 and/or the cyclone chamber 110 and/or the second stage cyclone chambers 120 need not be integral with each other, and the dirt collection chamber 119 and/or the cyclone chamber 110 and/or the second stage cyclone chambers 120 may be openable independently or in a sub-combination, e.g., the dirt collection chamber 119 and the cyclone chamber 110 may be openable independently of the second stage cyclone chambers 120 or the dirt collection chamber 119 and the second stage cyclone chambers 120 may be openable independently of the cyclone chamber 110.

Figure 15:
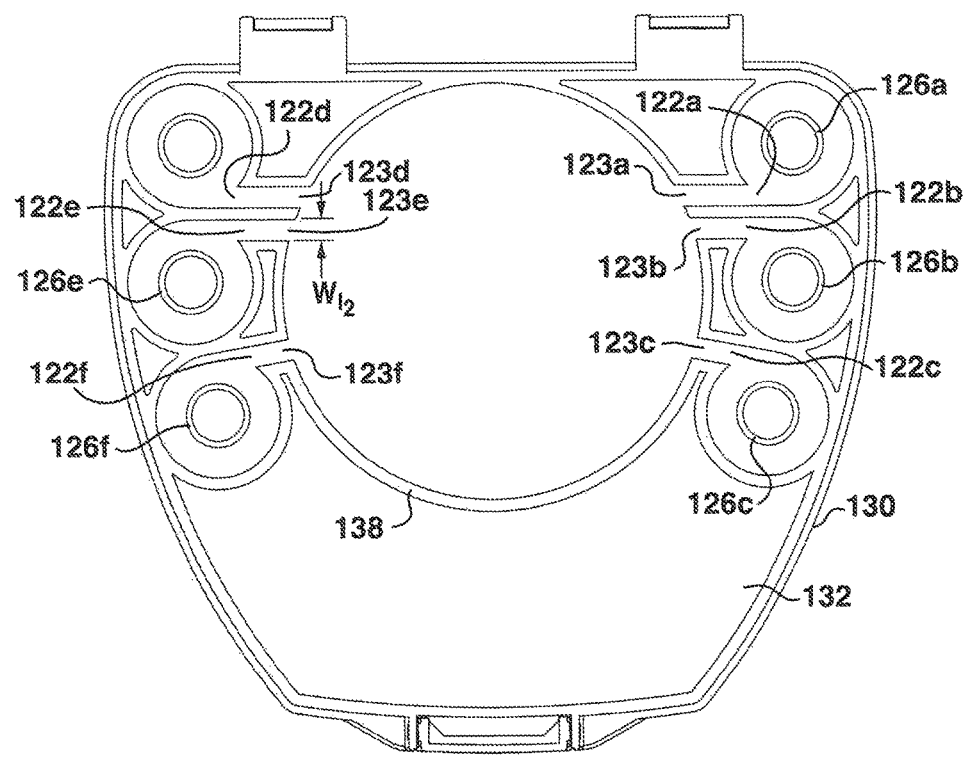
FIG. 15 is a top view of the bottom of the cyclone assembly of FIG. 2.

End wall 130 is preferably configured so that when it is in the closed position, the upper surface 132 cooperatively engages a lower surface of one or more of the sidewalls 108, 111, and 121*a-f*. For example, as shown in FIGS. 8 and 15, the upper surface 132 may have one or more channels or grooves 138 configured to receive the ends of sidewalls 108, 111, and 121*a-f* when the end wall 130 is in the closed position. Optionally, one or more sealing or gasketing elements may be provided between groove(s) 138 and the sidewall ends. Alternatively, the upper surface 132 may be relatively planar, and configured to abut the sidewalls 108, 111, and 121*a-f*, with or without gasketing elements.

Referring to FIG. 5, in the illustrated example, intermediate wall 140 acts as an upper end wall for both dirt collection chamber 119 and first stage cyclone chamber 110. Wall 140 is moveable between a closed position (FIG. 13) and an open position (FIG. 5). When the intermediate wall 140 is in the open position, the first stage cyclone chamber 110, the first stage dirt collection chamber 119, and the second stage cyclone chambers 120*a-f* can be emptied concurrently. Alternatively, the upper end walls of the dirt collection chamber 119 and/or the cyclone chamber 110 and/or the second stage cyclone chambers 120 need not be integral with each other, and the dirt collection chamber 119 and/or the cyclone chamber 110 and/or the second stage cyclone chambers 120 may be openable independently or in a sub-combination, e.g., the dirt collection chamber 119 and the cyclone chamber 110 may be openable independently of the second stage cyclone chambers 120 or the dirt collection chamber 119 and the second stage cyclone chambers 120 may be openable independently of the cyclone chamber 110.

Figure 6:
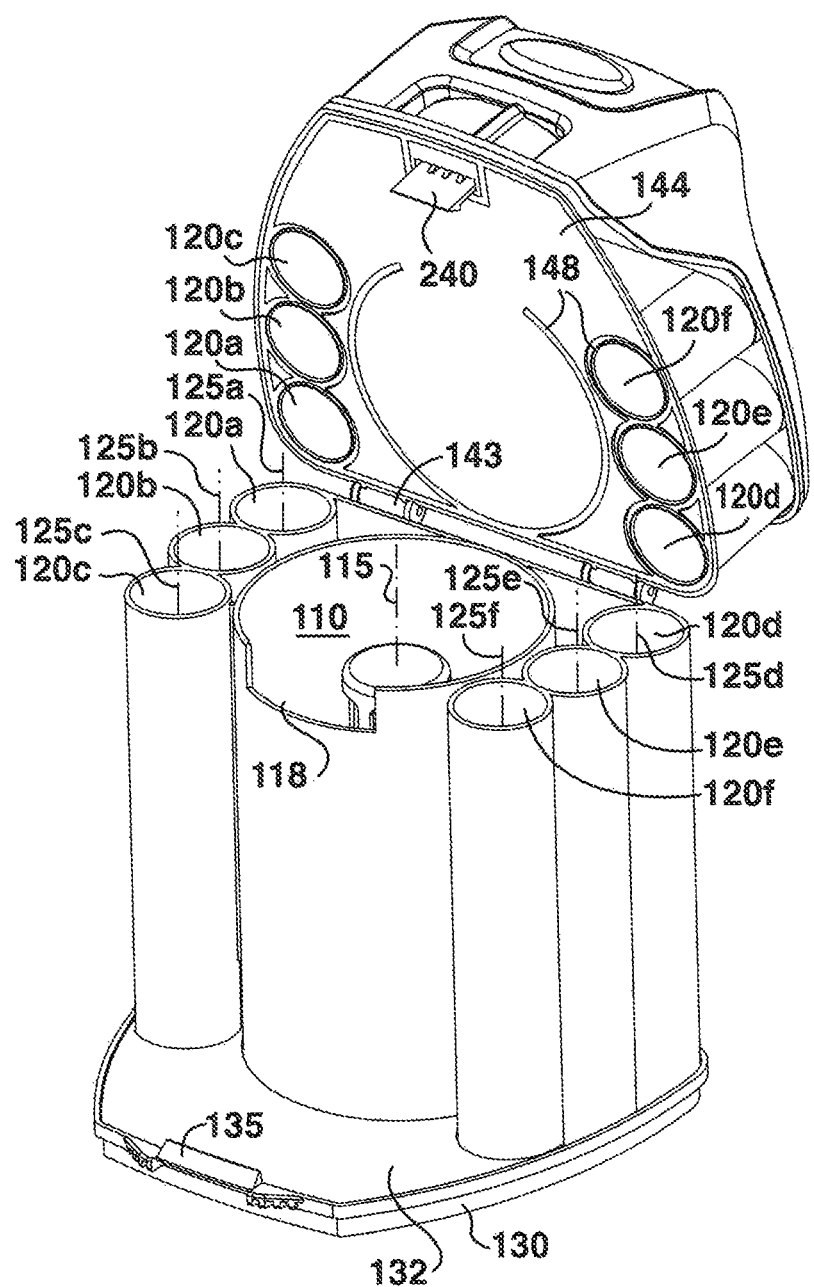
FIG. 6 is a perspective view of the cyclone assembly of FIG. 5, with portions of the outer wall removed for clarity.
Figure 7:
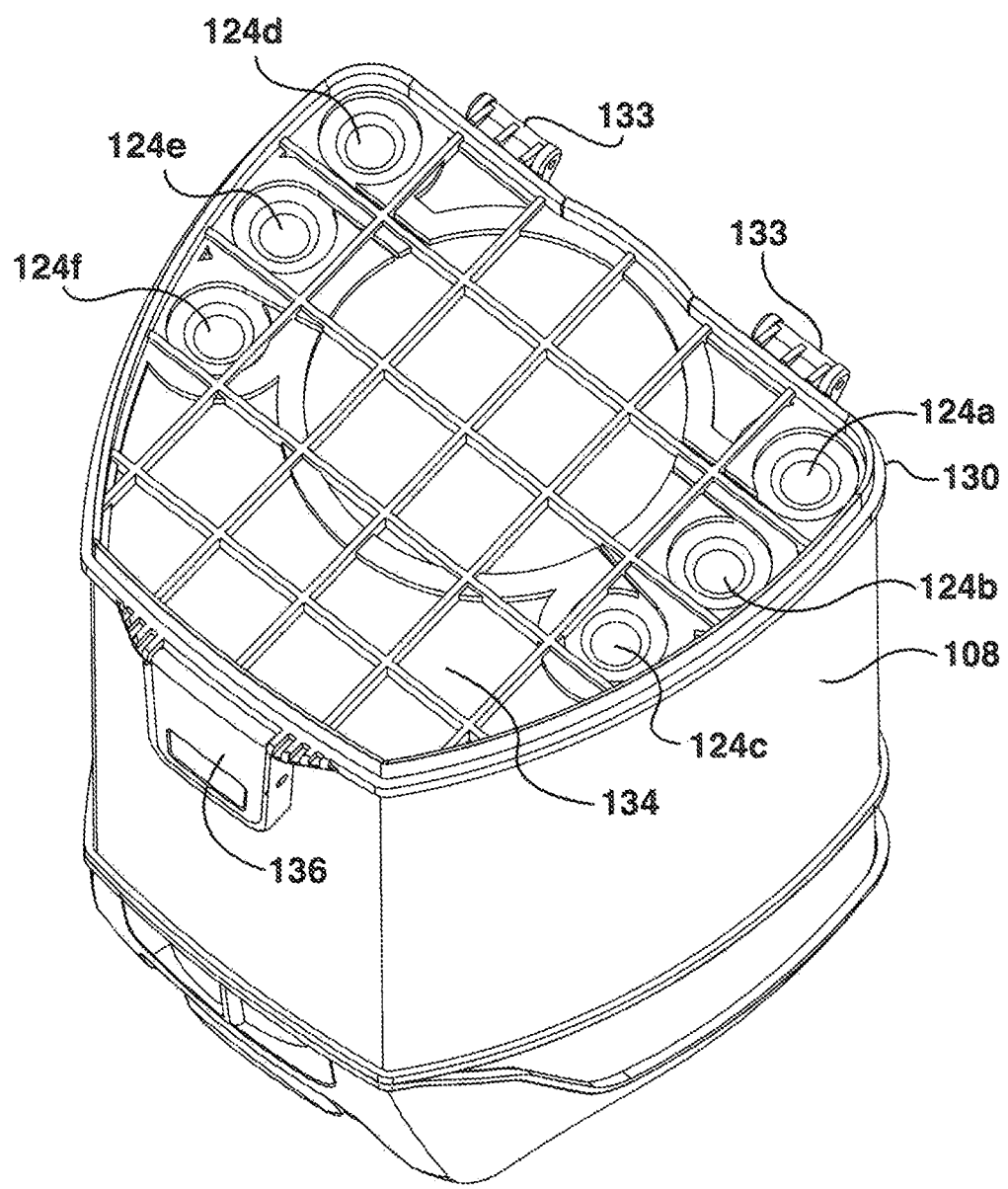
FIG. 7 is a bottom perspective view of the cyclone assembly of FIG. 2.

Wall 140 is preferably configured so that when it is in the closed position, the lower surface 144 cooperatively engages an upper surface of one or more of the sidewalls 108, 111, and 121*a-f*. For example, as shown in FIGS. 5 and 6, the lower surface 144 may have one or more channels or grooves 148 configured to receive the ends of sidewalls 108, 111, and 121*a-f* when the wall 140 is in the closed position. Optionally, one or more sealing or gasketing elements may be provided between groove(s) 148 and the sidewall ends. Alternatively, the lower surface 144 may be relatively planar, and configured to abut the sidewalls 108, 111, and 121*a-f*, with or without gasketing elements.

Figure 4:
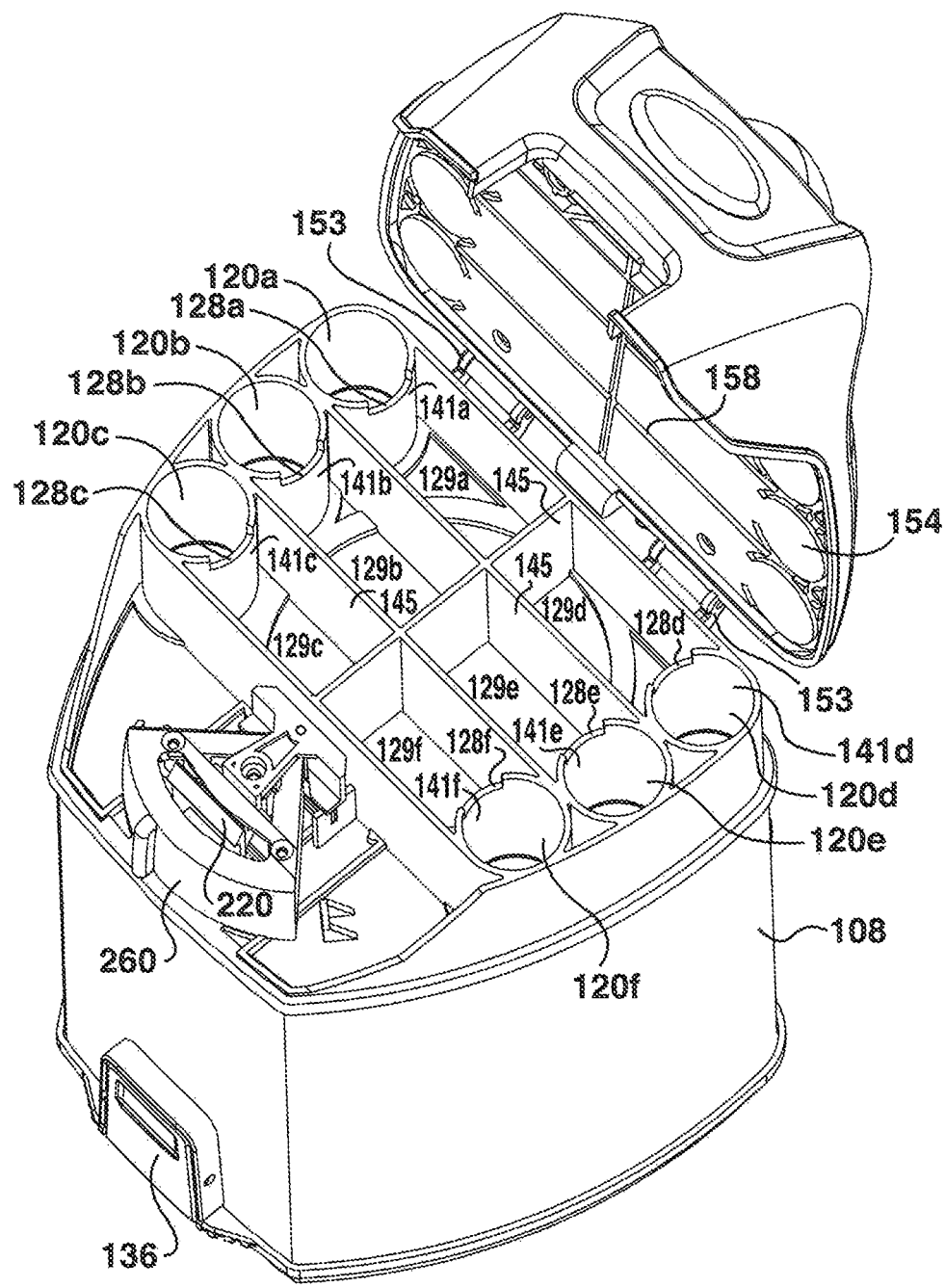
FIG. 4 is a top perspective view of the cyclone assembly of FIG. 2, with an upper lid in an open position.

As exemplified in FIGS. 4 and 11, a second stage dirt collection chamber 129 may be associated with each second stage cyclone chamber 120. As illustrated, each second stage dirt collection chamber 129*a-f* is in communication with a dirt outlet 128*a-f* of its respective cyclone chamber 120*a-f* to collect the dirt and debris as it exits that second stage cyclone chamber. Dirt collection chambers 129*a-f* may be of any suitable configuration. Referring to FIGS. 4 and 13, in the illustrated example, each dirt collection chamber 129 is bounded an upper sidewall extension 141, intermediate wall 140, upper end wall 150, and one or more interior divider walls 145.

Alternately, two or more second stage cyclone chambers 120 may be associated with a single second stage dirt collection chamber. Accordingly, for example, a single second stage dirt collection chamber may be provided. Collectively, the second stage dirt collection chamber(s) may be referred to generally as a second stage dirt collection region. Accordingly, while in the illustrated example each second stage cyclone chamber 120*a-f* has its own associated second stage dirt collection chamber 129*a-f*, this need not be the case. For example, fewer or no interior divider walls 145 may be provided, resulting in two or more second stage dirt outlets being in communication with a shared second stage dirt collection chamber.

As shown in FIGS. 9 and 10, in use air enters each second stage cyclone chamber 120*a-f* via an air inlet 122*a-f* and exits each chamber 120*a-f* via an air outlet 124*a-f*, while separated dirt and debris exits each cyclone chamber 120*a-f* via a dirt outlet 128*a-f*, where it collects in the second stage dirt collection region.

To help facilitate emptying the dirt collection chambers 129*a-f*, end wall 150 may be openable. Preferably, end wall 150 is moveable between a closed position (FIG. 13 and FIG. 5) and an open position (FIG. 4). When the end wall 150 is in the open position, the second stage dirt collection chambers 129*a-f* can be emptied concurrently.

Notably, in the illustrated configuration, when the end wall 150 is in a closed position and the intermediate wall 140 is in the open position, as shown in FIG. 5, the first stage cyclone chamber 110, the first stage dirt collection chamber 119, and the second stage cyclone chambers 120*a-f* may be emptied concurrently, while the second stage dirt collection chambers 129*a-f* remain closed.

It will be appreciated that the second stage dirt collection region may be opened regardless of the position of the upper end 104 (i.e., whether intermediate wall 140 is open or closed).

It will be appreciated that some of the embodiments disclosed herein may not use any of the features of the dirt collection chambers disclosed herein and that, in those embodiments, the dirt collection chambers may be of various constructions and that in those embodiments any dirt collection chamber known in the art may be used.

Cyclone Assembly with Openable Ends

The following is a description of a cyclone assembly that may be used by itself in any surface cleaning apparatus or in any combination or sub-combination with any other feature or features disclosed herein including the sizing of a second stage cyclone compared to a first stage cyclone, and the connection of the second stage cyclone chamber air outlets with an upstream chamber of a pre-motor filter.

FIGS. 23-27 exemplify another embodiment of a cyclone assembly, referred to generally as 100'. Cyclone assembly 100' may be used as an air treatment member to remove particulate matter (e.g. dirt, dust) from an air flow. Preferably, the cyclone assembly is removable from the surface cleaning apparatus. Providing a detachable cyclone assembly 100' may allow a user to carry the cyclone assembly 100' to a garbage can for emptying, without needing to carry or move the rest of the surface cleaning apparatus 10. Preferably, the cyclone assembly is removable as a closed module, which may help prevent dirt and debris from spilling out of the cyclone assembly 100' during transport for emptying.

Figure 23:
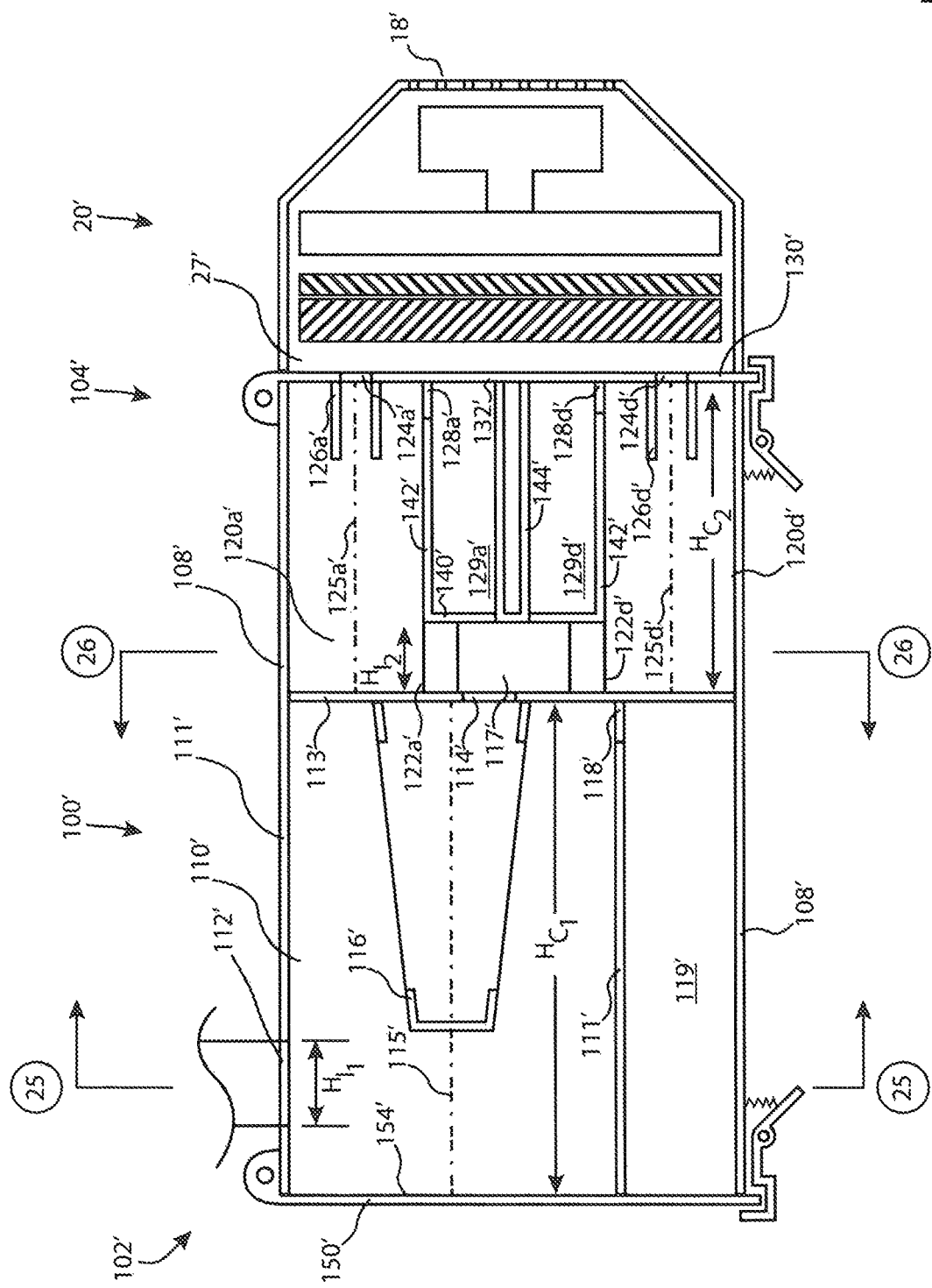
FIG. 23 is a cross-section view of a cyclone assembly and a suction source in accordance with another embodiment.
Figure 24:
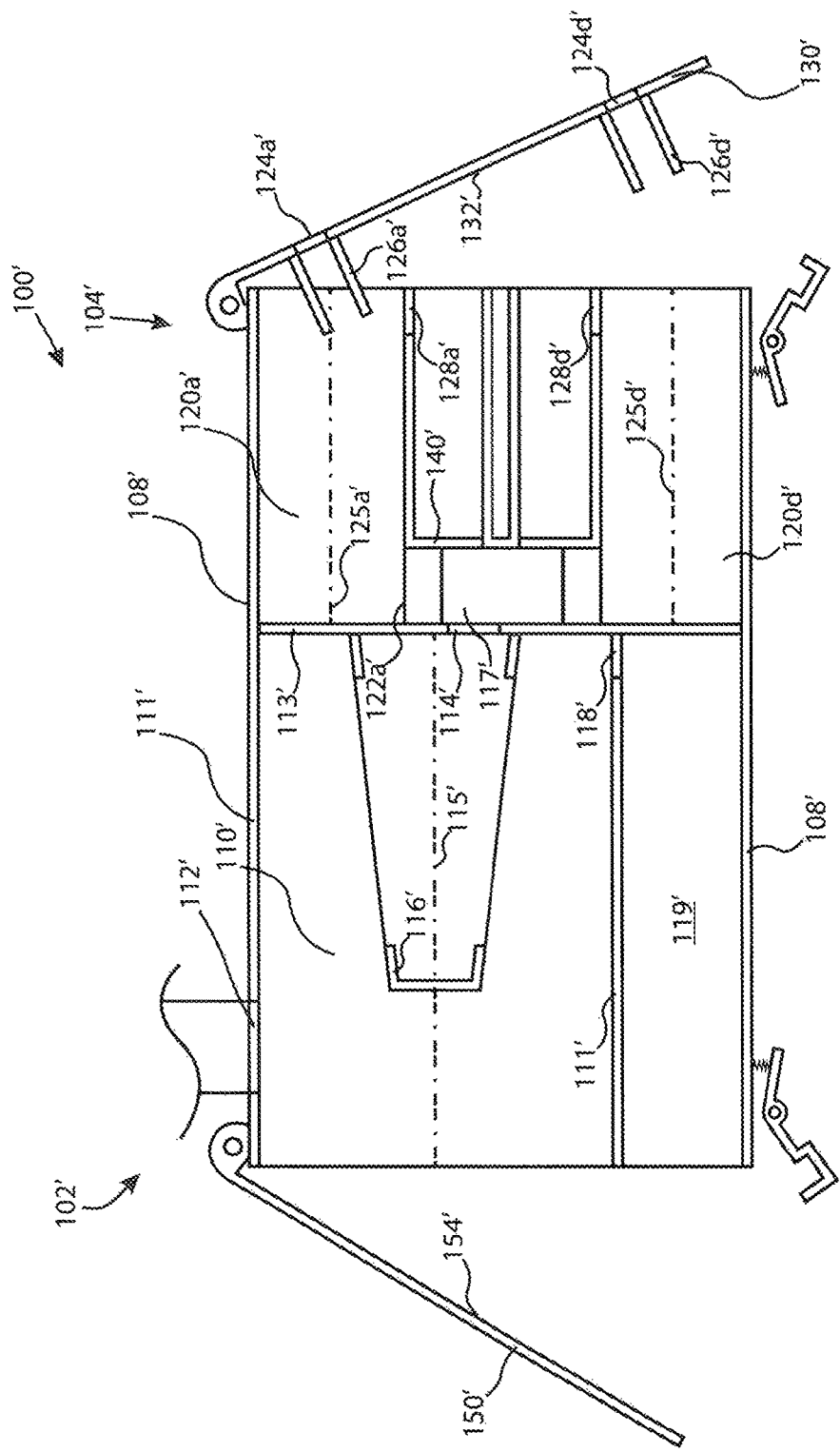
FIG. 24 is a cross-section view of the cyclone assembly of FIG. 23, with a first end of a first cyclonic cleaning stage in an open position and with a second end of a second cyclonic cleaning stage in an open position.

As exemplified in FIG. 23, the cyclone assembly 100' has a first end 102', a second end 104', and an outer sidewall 108'. Preferably, an assembly handle (not shown) may be provided to facilitate carrying of the cyclone assembly when it is detached from the surface cleaning apparatus 10.

Referring to FIGS. 23-27, cyclone assembly 100' includes a first cyclonic cleaning stage and a second cyclonic cleaning stage located downstream of the first cyclonic cleaning stage. The first cyclonic cleaning stage includes a first stage cyclone chamber 110' that extends along a cyclone axis 115' and includes a sidewall 111', which may be generally cylindrical, extending between a first end wall 150' and a second end wall 113'. In the illustrated embodiment, the first stage cyclone chamber 110' is arranged in a generally horizontal cyclone orientation. Alternatively, the first stage cyclone chamber may be provided in another orientation, for example as a vertical or inclined cyclone and may be of any cyclone configuration. Alternatively, or in addition, the first cyclonic cleaning stage may comprise a plurality of cyclone chambers instead of a single cyclone.

In the illustrated embodiment, the first stage cyclone chamber 110' includes a first stage cyclone air inlet 112' and a first stage cyclone air outlet 114'. First stage cyclone chamber 110' also includes at least one dirt outlet 118', through which dirt and debris that is separated from the air flow can exit the cyclone chamber 110'. While it is preferred that most or all of the dirt exit the first stage cyclone chamber via the dirt outlet 118', some dirt may settle on the sidewall 111' or the end walls 113', 150' of the cyclone chamber 110' (depending on the orientation of the cyclone chamber) and/or may be entrained in the air exiting the first stage cyclone chamber via the air outlet 114'.

In the illustrated example, the first stage cyclone dirt outlet 118' is in the form of a slot bounded by the cyclone side wall 111' and the second cyclone end wall 113', and is located toward the second end of the cyclone chamber 110'. Alternatively, the dirt outlet may be of any other suitable configuration, including, for example as an annular gap between the sidewall and an end wall of the cyclone chamber or a plate or other suitable member extending towards or into the second end of the cyclone chamber 110'.

Preferably, the first stage cyclone air inlet 112' is located toward the end of the cyclone chamber 110' spaced from the end with the dirt outlet (the second end in the illustrated example) and may be positioned adjacent the corresponding cyclone chamber end wall 150'. Preferably, the air inlet 112' is positioned so that air flowing through the inlet and into the first stage cyclone chamber is travelling generally tangentially relative to, and preferably adjacent, the sidewall 111' of the cyclone chamber 110'.

The cross-sectional shape of the air inlet 112' may be any suitable shape. In the illustrated example of FIG. 23, the air inlet has a cross-sectional shape that is generally rectangular (e.g., it has rounded corners and can be referred to as a rounded rectangle) having a height $H_{I_1}$ in the longitudinal direction (i.e. parallel to cyclone axis 115') and a width $W_{I_1}$ (see FIG. 25) in a transverse direction to cyclone axis 115'. The cross-sectional area of the air inlet 112' may be referred to as the cross-sectional area or flow area of the first stage cyclone air inlet 112'. Alternatively, instead of being a rounded rectangle, the cross-sectional shape of the air inlet may be another shape, including, for example, round, oval, square and rectangular.

Referring to FIG. 23, the first stage cyclone chamber 110' has a height $H_{C_1}$ in the longitudinal direction (i.e. parallel to cyclone axis 115'), being the distance between the second end wall 113' and first end wall 150'. The height of the first stage cyclone chamber 110' is preferably selected such that air entering the cyclone chamber via inlet 112' is expected to rotate approximately 3 to 6 times, 3 to 5 times, 2 to 4 times or three-and-a-half times in the first stage cyclone chamber prior to exiting the cyclone chamber via outlet 114'.

In general, it may be assumed that the airflow against the cyclone chamber sidewall as it progresses around the cyclone chamber maintains a degree of cohesion, and that during each revolution within a cyclone chamber, an air stream moves in the longitudinal direction towards an end of the cyclone chamber by a distance approximately equal to the height of the cyclone chamber air inlet. For example, in a cyclone chamber that has a longitudinal height that is five times greater than the longitudinal height of its air inlet, the resulting cyclone may be expected to rotate about five times as it travels from the end of the cyclone chamber that has the air inlet to the opposite end of the cyclone chamber.

Thus, in order to promote the formation of a cyclone that is expected to rotate about three-and-a-half times in the first stage cyclone chamber 110', the height of the first stage cyclone chamber 110' may be between 3 and 4 times the height of the first stage cyclone air inlet 112'.

Air may exit the first stage cyclone chamber 110' via the first stage air outlet 114'. Preferably, the cyclone air outlet is positioned in one of the cyclone chamber end walls and, in the example illustrated, is positioned in the opposite end as the air inlet 112' and air outlet 114' may be positioned adjacent or at the end wall 113'. As exemplified, the air outlet 114' may be generally circular in cross-sectional shape. Preferably, the cross-sectional or flow area of the first stage cyclone air outlet 114' is generally equal to the flow area of the first stage cyclone air inlet 112'. In the illustrated example, the cyclone air outlet 114' comprises a vortex finder 116'.

Air exiting the first stage air outlet 114' may be directed into a chamber, header or manifold 117'. From there, the air is directed into the second cyclonic cleaning stage through one or more air flow passages. The second cyclonic cleaning stage includes a plurality of second stage cyclone chambers 120' arranged in parallel. In the illustrated embodiment, seven second stage cyclone chambers are shown, referred to as 120a', 120b', 120c', 120d', 120e', 120f', and 120g', respectively.

In the illustrated embodiment, each second stage cyclone chamber 120' is arranged in a generally horizontal cyclone orientation (e.g., the axis of the second stage cyclones are substantially parallel to, or parallel to the axis of the first stage cyclone). It will be appreciated that, in use, the cyclones may be of various orientations. The second stage cyclone chambers may be of any cyclone configuration.

In the illustrated embodiment, each second stage cyclone chamber extends along a respective cyclone axis 125' (see e.g. FIGS. 23 and 26) and extends between a second end wall 130' and a first end wall 113'. In the illustrated embodiment, each second stage cyclone chamber is bounded by a sidewall 121a', 121b', 121c', 121d', 121e', 121f', and 121g', respectively.

In the illustrated embodiment, each second stage cyclone chamber 120' includes an airflow passage 123' extending from manifold 117' to a second stage cyclone air inlet 122' and a second stage cyclone air outlet 124'. Each second stage cyclone chamber 120' also includes at least one dirt outlet 128', through which dirt and debris that is separated from the air flow can exit the cyclone chamber 120'. While it is preferred that most or all of the dirt entrained in the air exiting the first cyclonic cleaning stage exits the second stage cyclone chambers via the dirt outlets 128', some dirt may settle on the sidewalls 121' or the end walls 130', 113' of the cyclone chambers 120' (depending on the orientation of the cyclone chambers) and/or may be entrained in the air exiting the second stage cyclone chambers via the air outlets 124'.

In some embodiments, all or substantially all of the dirt entrained in the air exiting the first cyclonic cleaning stage may be removed from the airflow by the second cyclonic cleaning stage. This may, for example, obviate the need to provide a pre-motor filter in the surface cleaning apparatus 10.

In the illustrated embodiment, the air inlets of the second stage cyclone chambers (i.e. air inlets 122a'-122g') are centrally positioned, in a transverse or radial direction, in the second cyclonic cleaning stage. Also, in the illustrated embodiment, the air inlets of the second stage cyclone chambers are axially spaced from and face first stage cyclone air outlet 114'. Providing centrally positioned second stage cyclone air inlets and/or axially spacing the second stage cyclone air inlets from an air outlet of the first cyclonic cleaning stage may have one or more advantages. For example, it may provide for a more compact design of a second cyclonic cleaning stage and/or cyclone assembly. Also, such a design may facilitate airflow through the first and second cyclonic cleaning stages with reduced backpressure.

In the illustrated example, each second stage cyclone dirt outlet 128' is in the form of a slot bounded by the cyclone side wall 121' and the cyclone end wall 130', and is located toward the second end of the cyclone chamber 120'. Alternatively, the dirt outlet may be of any other suitable configuration, including, for example, as an annular gap between the sidewall and an end wall of the cyclone chamber or a plate or other suitable member extending towards or into the open upper end of the cyclone chamber 120'.

Preferably, each second stage cyclone air inlet 122' is located toward the end of the cyclone chamber 120' spaced from the end with the dirt outlet (the second end in the illustrated example) and may be positioned adjacent the corresponding cyclone chamber end wall 113'. Alternatively, the cyclone air inlet 122' may be provided at another location within the second stage cyclone chamber 120'. Preferably, each air inlet 122' is positioned so that air flowing through the inlet and into a second stage cyclone chamber is travelling generally tangentially relative to, and preferably adjacent, the sidewall 121' of that cyclone chamber 120'.

The cross-sectional shape of the air inlet 122' may be any suitable shape. In the illustrated example each air inlet has a cross-sectional shape that is generally rectangular, having a height $H_{I_2}$ in the longitudinal direction (i.e. parallel to cyclone axis 125') and a width in a transverse direction. The total cross-sectional area of the second stage air inlets (i.e. the sum of the cross-sectional areas of each inlet 122a', 122b', 122c', 122d', 122e', 122f', and 122g') may be referred to as the total cross-sectional area or total flow area of the second cyclonic cleaning stage.

Referring to FIG. 23, each second stage cyclone chamber 120' has a height $H_{C_2}$ in the longitudinal direction (i.e. parallel to cyclone axis 125'). The height of each second stage cyclone chamber 120' is preferably selected such that air entering the cyclone chambers via inlets 122' is expected to rotate approximately 3 to 6 times, 3 to 5 times, 2 to 4 times or three-and-a-half times in each second stage cyclone chamber prior to exiting the cyclone chamber via outlet 124'. For example, the height $H_{C_2}$ of a second stage cyclone chamber 120' may be between 3 and 4 times the height of a second stage cyclone air inlet 122'.

Air may exit each second stage cyclone chambers 120' via a second stage air outlet 124' provided for each cyclone chamber 120'. Preferably, the cyclone air outlets 124' are positioned in one of the end walls of each cyclone chamber 120' and, in the example illustrated, are positioned in the opposite ends as the air inlets 122'. As exemplified, the air outlets 124' may be generally circular in cross-sectional shape. Preferably, the cross-sectional or flow area of each second stage cyclone air outlet 124' is generally equal to the flow area of the second stage cyclone air inlet 122' for its respective cyclone chamber. In the illustrated example, each cyclone air outlet 124' comprises a vortex finder 126'.

Figure 25:
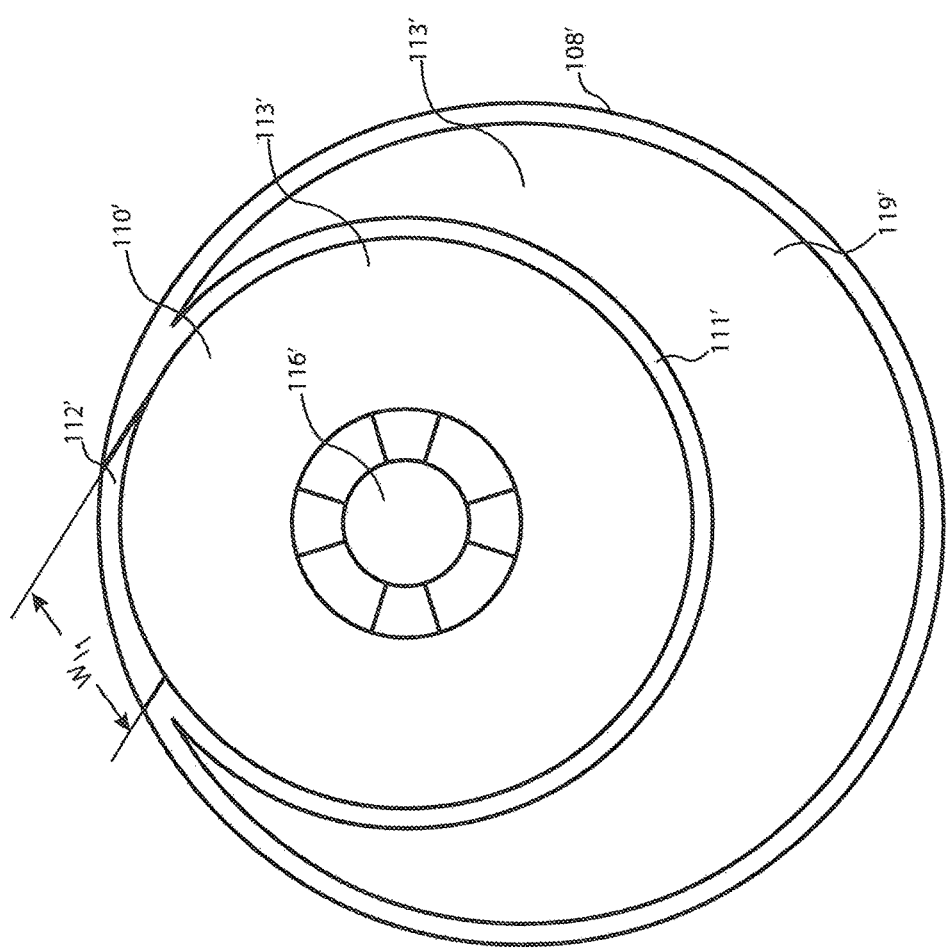
FIG. 25 is an axial cross-section view of the cyclone assembly of FIG. 23, taken along line 25-25.
Figure 26:
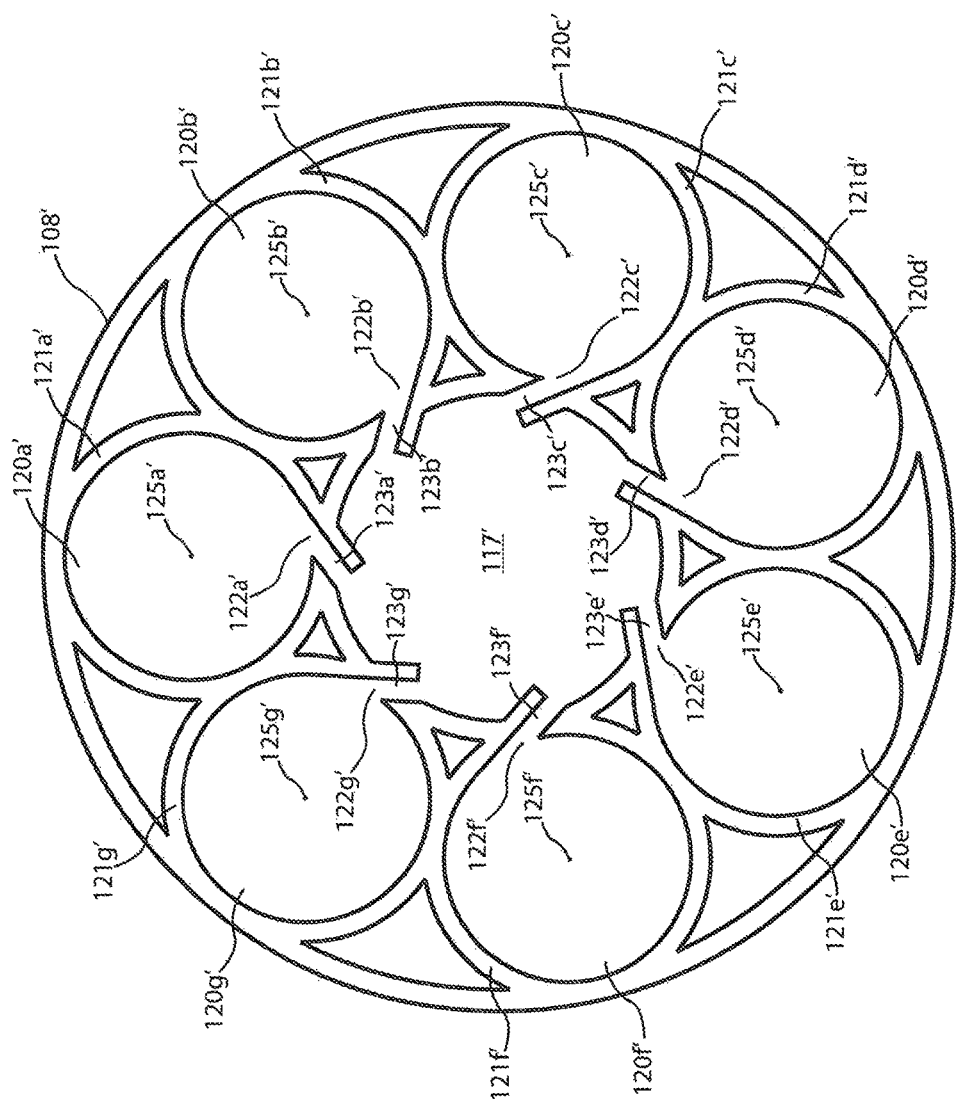
FIG. 26 is an axial cross-section view of the cyclone assembly of FIG. 23, taken along line 26-26; and, FIG. 27 is an end view of the second cyclonic cleaning stage of the cyclone assembly of FIG. 23, with the second end of a second cyclonic cleaning stage removed to reveal a plurality of second stage cyclone chambers and a plurality of second stage dirt collection chambers.

Referring to FIGS. 23 and 25, a first stage dirt collection chamber 119' is in communication with dirt outlet 118' to collect the dirt and debris as it exits first stage cyclone chamber 110'. Dirt collection chamber 119' may be of any suitable configuration. In the illustrated example, the dirt collection chamber 119' is bounded by outer sidewall 108', first stage cyclone side wall 111', and first and second end walls 150', 113' of the first cyclonic cleaning stage.

In use, air enters the first stage cyclone chamber 110' via air inlet 112' and exits the chamber 110' via air outlet 114', while separated dirt and debris exits the cyclone chamber 110' via dirt outlet 118', where it collects in the first stage dirt collection chamber 119'.

To help facilitate emptying the dirt collection chamber 119', at least one of or both of the end walls 150', 113' may be openable. In the illustrated example, end wall 150' is moveable between a closed position (e.g. FIG. 23) and an open position (e.g. FIG. 24). When the end wall 150' is in the open position, the first stage dirt collection chamber 119' and the cyclone chamber 110' may be emptied concurrently.

End wall 150' is preferably configured so that when it is in the closed position, the inner surface 154' cooperatively engages an end surface of one or more of the sidewalls 108' and 111'. For example, the inner surface 154' may have one or more channels or grooves configured to receive the ends of sidewalls 108' and 111' when the end wall 150' is in the closed position. Optionally, one or more sealing or gasketing elements may be provided between such groove(s) and the sidewall ends. Alternatively, the inner surface 154' may be relatively planar, and configured to abut the ends of sidewalls 108' and 111', with or without gasketing elements.

As exemplified in FIGS. 23 and 23, a second stage dirt collection chamber 129' may be associated with each second stage cyclone chamber 120'. As illustrated, each second stage dirt collection chamber 129a'-129g' is in communication with a dirt outlet 128a'-128g' of its respective cyclone chamber 120a'-120g' to collect the dirt and debris as it exits that second stage cyclone chamber. Dirt collection chambers 129a'-129g' may be of any suitable configuration. In the illustrated example, dirt collection chamber 129a' is bounded by an intermediate wall 140', second end wall 130' of the second cyclonic cleaning stage, interior divider walls 145a' and 145g', and annular divider walls 142' and 144' of the second cyclonic cleaning stage; dirt collection chamber 129b' is bounded by intermediate wall 140', second end wall 130', interior divider walls 145a' and 145b', and annular divider walls 142' and 144'; dirt collection chamber 129c' is bounded by intermediate wall 140', second end wall 130', interior divider walls 145b' and 145c', and annular divider walls 142' and 144'; dirt collection chamber 129d' is bounded by intermediate wall 140', second end wall 130', interior divider walls 145c' and 145d', and annular divider walls 142' and 144'; dirt collection chamber 129e' is bounded by intermediate wall 140', second end wall 130', interior divider walls 145d' and 145e', and annular divider walls 142' and 144'; dirt collection chamber 129f' is bounded by intermediate wall 140', second end wall 130', interior divider walls 145e' and 145f, and annular divider walls 142' and 144'; and dirt collection chamber 129g' is bounded by intermediate wall 140', second end wall 130', interior divider walls 145f' and 145g', and annular divider walls 142' and 144'.

Alternatively, two or more second stage cyclone chambers 120' may be associated with a single second stage dirt collection chamber. Accordingly, for example, a single second stage dirt collection chamber may be provided. Collectively, the second stage dirt collection chamber(s) may be referred to generally as a second stage dirt collection region. Accordingly, while in the illustrated example each second stage cyclone chamber 120a'-120g' has its own associated second stage dirt collection chamber 129a'-129g', this need not be the case. For example, fewer or no interior divider walls 145a'-g' or annular divider wall 144' may not be provided, resulting in two or more (e.g. all) of the second stage dirt outlets being in communication with one or more shared second stage dirt collection chamber(s).

In use, air enters each second stage cyclone chamber 120a'-120g' via an air inlet 122a'-122g' and exits each chamber 120a'-120g' via an air outlet 124a'-124g', while separated dirt and debris exits each cyclone chamber 120a'-120g' via a dirt outlet 128a'-128g', where it collects in the second stage dirt collection region.

In the illustrated embodiment, the second stage dirt collection region (i.e. second stage dirt collection chamber 129a'-129g') is centrally positioned, in a transverse direction, in the second cyclonic cleaning stage. Also, in the illustrated embodiment, the second stage cyclone chambers are positioned around the second stage dirt collection region (i.e. second stage dirt collection chamber 129a'-129g'). Providing a centrally positioned dirt collection region, and/or positioning the second stage cyclone chambers around the second stage dirt collection region may have one or more advantages. For example, it may provide for a more compact design of a second cyclonic cleaning stage and/or cyclone assembly. Also, such a design may facilitate the provision of a single shared second stage dirt collection chamber. Further, it may simplify emptying of the second cyclonic stage.

Also, in the illustrated embodiment, the second stage dirt collection region (i.e. second stage dirt collection chamber 129a'-129g') is axially spaced from first stage cyclone air outlet 114'. Also, intermediate wall 140' of second stage dirt collection region faces first stage cyclone air outlet 114'. Such a configuration may have one or more advantages. For example, it may provide for a more compact design of a second cyclonic cleaning stage and/or cyclone assembly.

Referring to FIG. 23, in the illustrated example, second end wall 130' acts as an end wall for each of second stage cyclones 120a'-120g' and second stage dirt collection chambers 129a'-129g'. Wall 130' is moveable between a closed position (e.g. FIG. 23) and an open position (e.g. FIG. 24). When the end wall 130' is in the open position, the second stage cyclone chambers 120a'-120g' and the second stage dirt collection chambers 129a'-129g' can be emptied concurrently.

Wall 130' is preferably configured so that when it is in the closed position, the inner surface 132' cooperatively engages an end surface of one or more of the sidewalls 108', 121a', and 121b', interior divider walls 145a'-g', and annular divider walls 142', 144'. For example, the inner surface 132' may have one or more channels or grooves configured to receive the ends of sidewalls 108', 121a', 121b' and/or divider walls 145a'-g', 142', and 144' when the wall 130' is in the closed position. Optionally, one or more sealing or gasketing elements may be provided between such groove(s) and the sidewall and/or divider wall ends. Alternatively, the inner surface 132' may be relatively planar, and configured to abut the sidewalls 108', 121a', 121b' and/or divider walls 145a'-g', 142', and 144', with or without gasketing elements.

In the illustrated embodiment, the second end of the first cyclonic cleaning stage is proximal to the first end of the second cyclonic cleaning stage. For example, as exemplified, end wall 113' may act as both a second end wall of the first stage cyclone chamber 110' and as a first end wall of the second stage cyclone chambers 120'.

Providing a common end wall between the first and second cyclonic cleaning stages may have one or more advantages. For example, it may provide for a more compact design of a cyclone assembly. Alternatively, or additionally, such a design may be simpler and/or more economical to manufacture.

It will be appreciated that, in the illustrated example, the first stage dirt collection region may be opened regardless of the position of the second end wall of the second cyclonic cleaning stage (i.e., whether end wall 130' is open or closed). Similarly, in the illustrated example, the second stage dirt collection region may be opened regardless of the position of the first end wall of the first cyclonic cleaning stage (i.e., whether end wall 150' is open or closed).

Latching Mechanism

The following is a description of a dual opening latching mechanism that may be used by itself in any surface cleaning apparatus or in any combination or sub-combination with any other feature or features disclosed herein including the sizing of a second stage cyclone compared to a first stage cyclone, the positioning of a dirt collection region for second stage cyclones and the connection of the second stage cyclone chamber air outlets with an upstream chamber of a pre-motor filter.

In accordance with this feature, a latching mechanism with a multi-position switch or release mechanism may be provided to selectively retain the intermediate wall 140 and/or the upper end wall 150 in its respective closed position. An advantage of this design is that it may prevent a user from inadvertently opening both the intermediate wall 140 and the upper end wall 150 at the same time.

As exemplified in FIGS. 16-22, a latching mechanism, referred to generally as 200, is provided between the intermediate wall 140 and the upper end wall 150. Latching mechanism 200 includes an upper latch for selectively retaining upper end wall 150 in its closed position, and a lower latch for selectively retaining intermediate end wall 140 in its closed position. A release switch 260 is provided for selectively disengaging the upper latch or the lower latch.

Release switch 260 is an actuator that is moveable in two different directions, (e.g., left and right). When the actuator is moved in a first direction, a first locking member is moved to an unlocked position while a second locking member is maintained in a locked position. When the actuator is moved in a second direction, which may be an opposite direction to the first direction, the second locking member is moved to an unlocked position while the first locking member is maintained in a locked position. It will be appreciated that the first and second locking members may be separate elements or they may be opposite ends of a single linkage.

Figure 17:
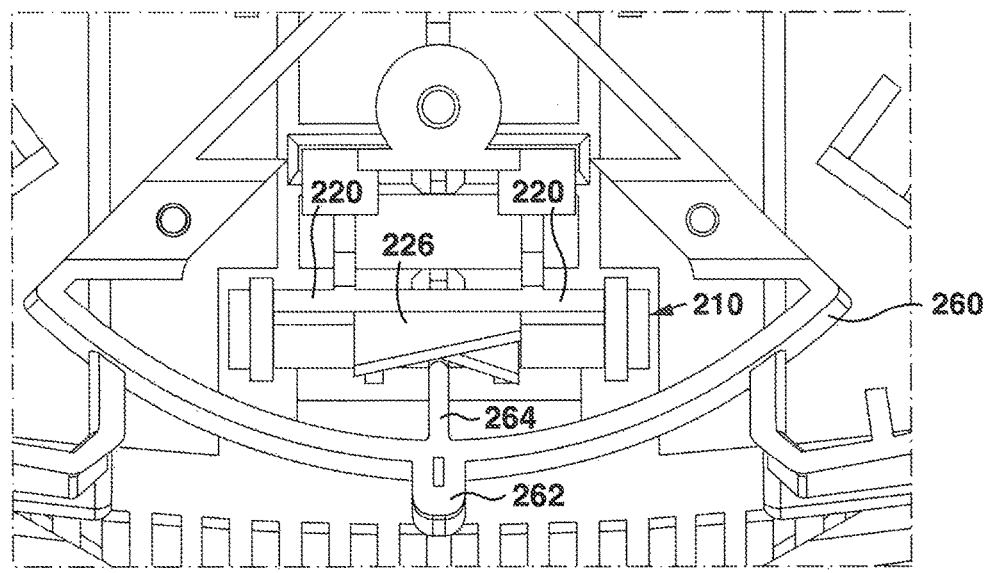
FIG. 17 is a top view of the enlarged portion of FIG. 16.
Figure 18:
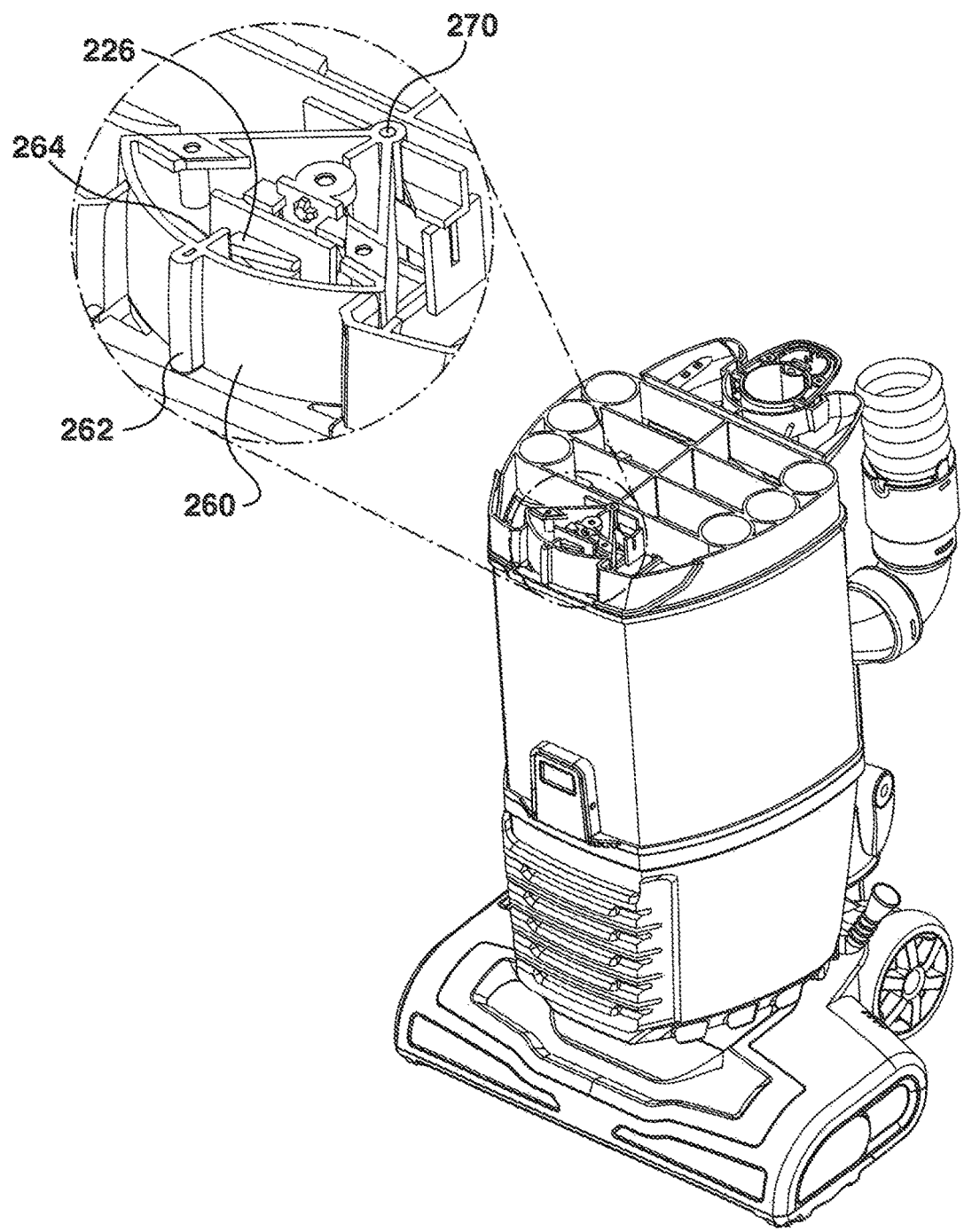
FIG. 18 is a cross-section view of the surface cleaning apparatus of FIG. 1, taken along line 16-16 shown in FIG. 1, with the release mechanism in a first unlocked position.
Figure 19:
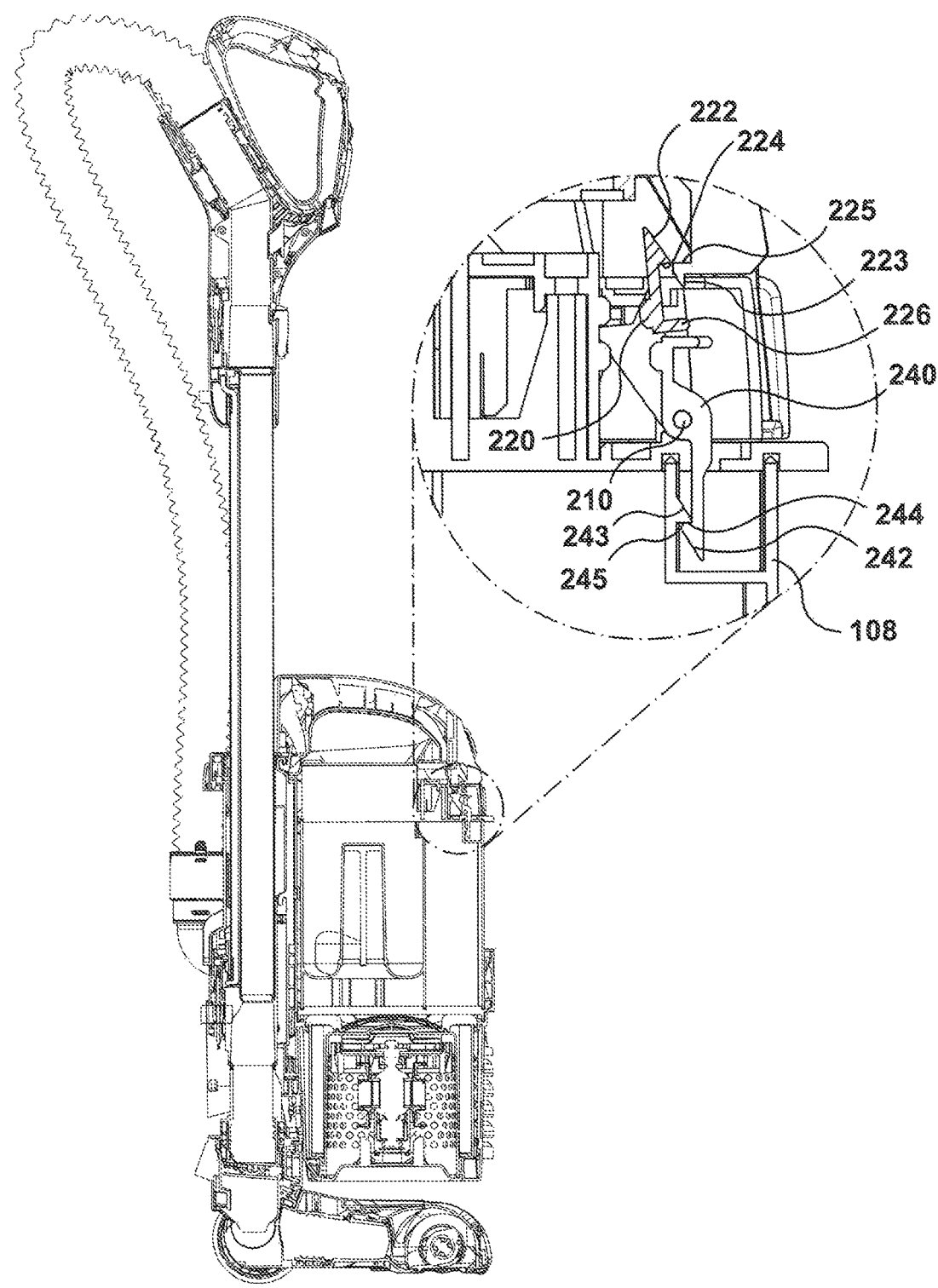
FIG. 19 is a cross-section view of the surface cleaning apparatus of FIG. 1, with the release mechanism in a first unlocked position.
Figure 22:
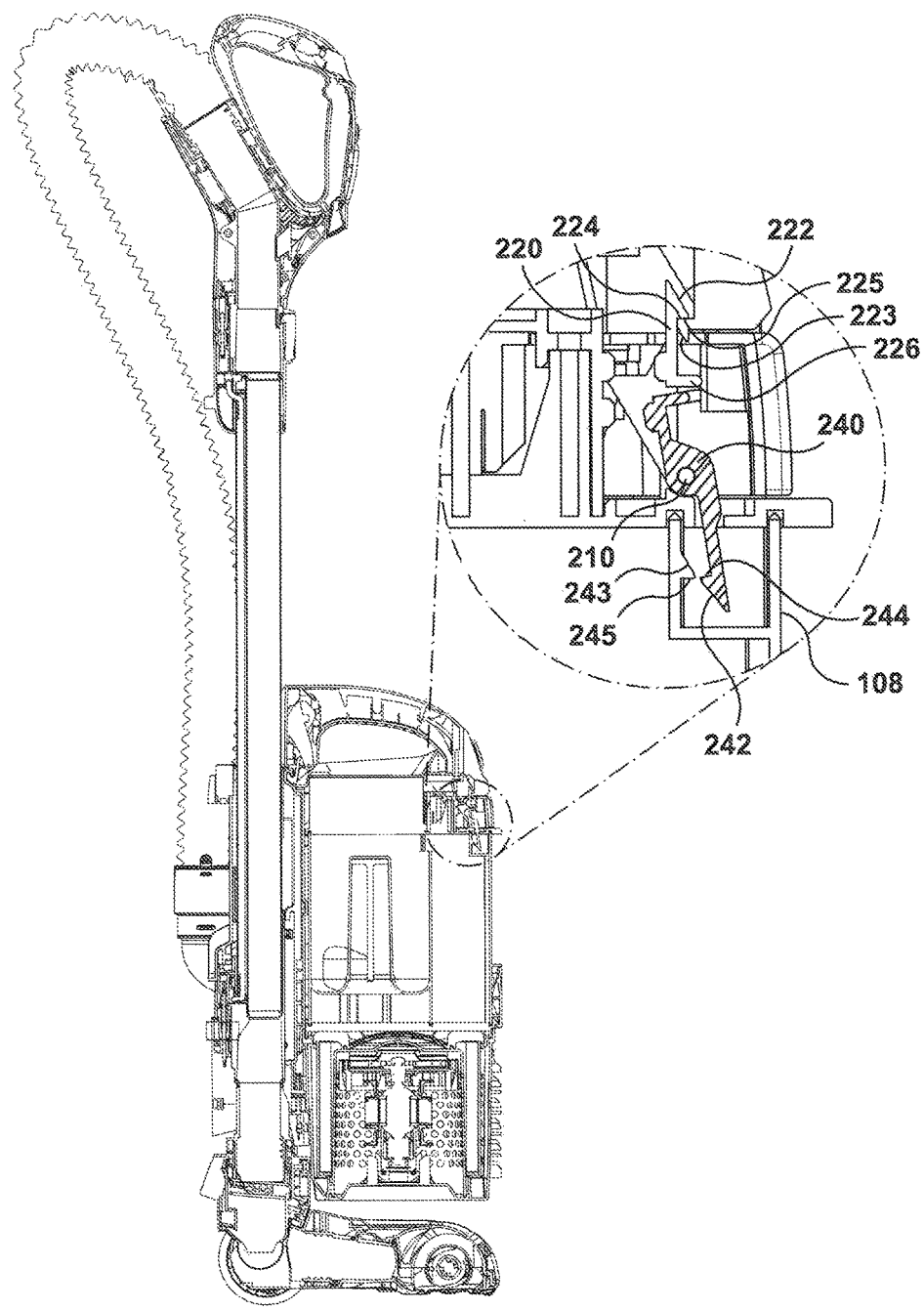
FIG. 22 is a cross-section view of the surface cleaning apparatus of FIG. 1, with the release mechanism in the second unlocked position.

As exemplified in FIGS. 17, 19, and 22, the upper latch includes a generally U-shaped latching bar 220 that is pivotally coupled to a shaft 210. Shaft 210 is parallel to both the intermediate wall 140 and the upper end wall 150. The upper end of the latching bar 220 has a downwardly facing surface 224 that is configured to engage with a lip or flange 225 extending from the upper end wall 150 to cooperatively retain the end wall 150 in its closed position. When the latching bar 220 is in a locked position (as shown in FIGS. 17 and 22) and upper end wall 150 in its closed position, downwardly facing surface 224 overlies flange 225, thereby retaining upper end wall 150 in its closed position. Preferably, latching bar 220 is biased towards its locked position, for example, using a spring or other biasing member(s) (not shown).

The upper end of the latching bar 220 also has an upwardly facing angled or beveled surface 222 that is configured to pivot the latching bar 220 away from the locked position when engaged by an angled or beveled surface 223 of flange 225, thereby allowing the upper latch to be engaged by bringing the end wall 150 to its closed position.

Latching bar 220 also has a flange or projection 226 that extends generally forwardly. As shown in FIG. 17, projection 226 is angled or sloped such that one lateral end of the projection 226 extends further forward than the opposite lateral end.

Figure 21:
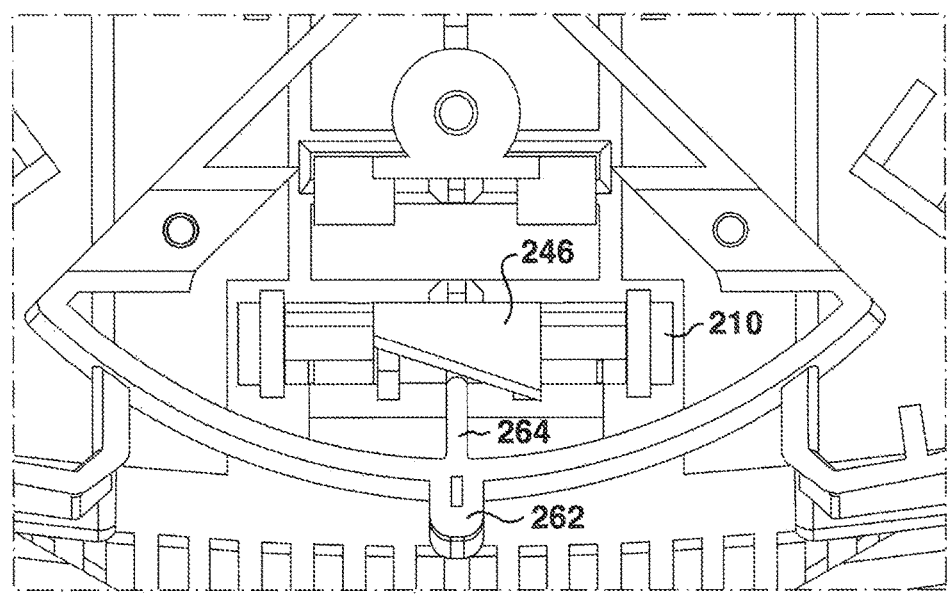
FIG. 21 is a top view of the enlarged portion of FIG. 20, with the release mechanism in a neutral position.

As exemplified in FIGS. 19, 21, and 22, the lower latch includes a latching bar 240 that is also pivotally coupled to shaft 210. The lower end of latching bar 240 has an upwardly facing surface 244 that is configured to engage with a lip or flange 245 extending from the outer sidewall 108 to cooperatively retain the intermediate wall 140 in its closed position. When the latching bar 240 is in a locked position (as shown in FIGS. 19 and 21) and intermediate wall 140 in its closed position, upwardly facing surface 244 overlies flange 245, thereby retaining intermediate wall 140 in its closed position. Preferably, latching bar 240 is biased towards its locked position, for example, using a spring or other biasing member(s) (not shown).

The lower end of the latching bar 240 also has a downwardly facing angled or beveled surface 242 that is configured to pivot the latching bar 240 away from its locked position when engaged by an angled or beveled surface 243 of flange 245, thereby allowing the lower latch to be engaged by bringing the intermediate wall 140 to its closed position.

Latching bar 240 also has a flange or projection 246 that extends generally forwardly. As exemplified in FIGS. 17 and 21, projection 246 is angled or sloped such that one lateral end of the projection 246 extends further forward than the opposite lateral end. Notably, projections 246 and 226 are angled in opposite directions. This arrangement facilitates the selective unlatching of either the upper or lower latch using a single multi-position switch or release mechanism.

Figure 16:
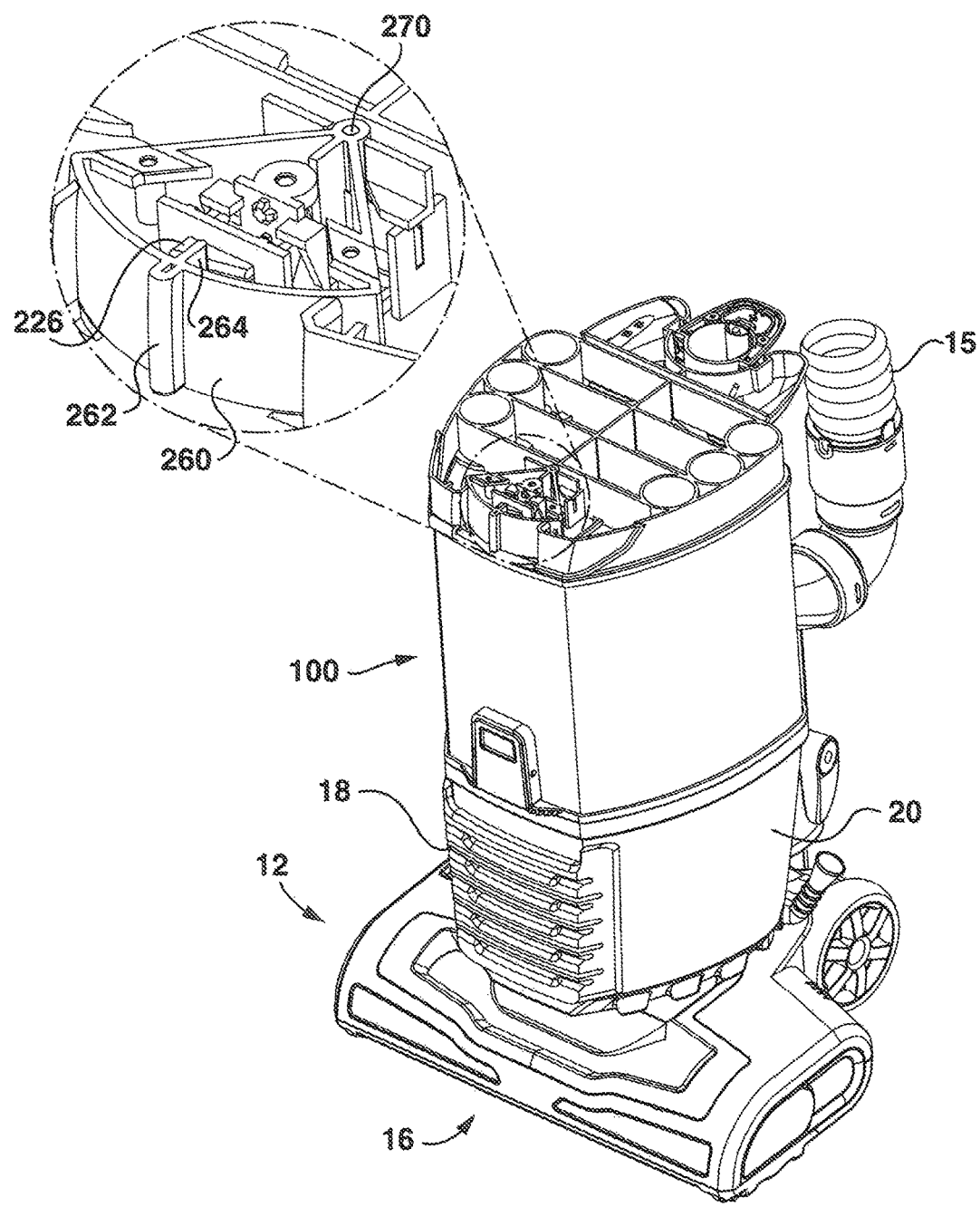
FIG. 16 is a cross-section view of the surface cleaning apparatus of FIG. 1, taken along line 16-16 shown in FIG. 1, with a release mechanism in a neutral position.

As exemplified in FIG. 16, the release switch 260 for latching mechanism 200 is rotatably or pivotally coupled to a shaft 270. Shaft 270 is generally perpendicular to both the intermediate wall 140 and the upper end wall 150. Release switch 260 also includes an outwardly facing projection or tab 262 to facilitate a user's rotation of switch 260 about shaft 270. Release switch 260 also includes an inwardly facing flange or projection 264 that is configured to engage the projections 226, 246 of the upper and lower latching bars 220, 240, respectively.

As exemplified in FIGS. 16, 17 and 21, the release switch 260 is shown in a neutral position. In this position, inwardly facing projection 264 is not in contact with either projection 226 or projection 246. As the release switch 260 is pivoted towards the position shown in FIG. 18, projection 264 is brought into abutment with projection 226 of the upper latching mechanism. Further pivoting of release switch 260 forces the upper latching bar 220 away from its locked position, and thereby unlatching the upper latch (as shown in FIG. 19) and permitting the upper end wall 150 to be moved to an open position.

Figure 20:
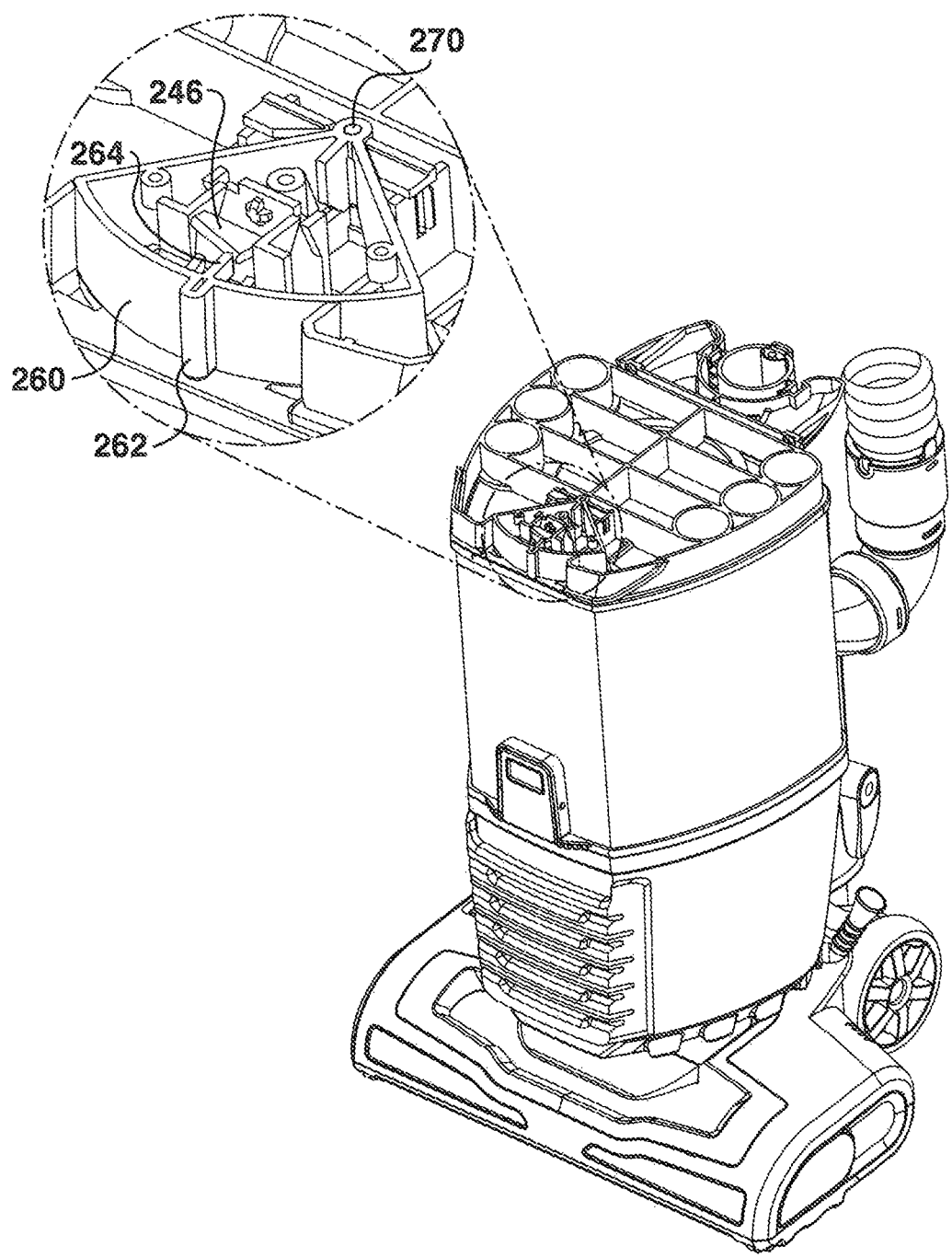
FIG. 20 is a cross-section view of the surface cleaning apparatus of FIG. 1, taken along line 20-20 shown in FIG. 1, with the release mechanism in a second unlocked position.

Alternatively, if the release switch 260 is pivoted towards the position shown in FIG. 20, projection 264 is brought into abutment with projection 246 of the lower latching mechanism. Further pivoting of release switch 260 forces the lower latching bar 240 away from its locked position, and thereby unlatching the lower latch (as shown in FIG. 22) and permitting the intermediate wall 140 to be moved to an open position.

It will be appreciated that some of the embodiments disclosed herein may not use any of the features of the latching mechanisms disclosed herein and that, in those embodiments, mechanisms for retaining the intermediate and upper walls in their closed positions may be of various constructions and that in those embodiments any latching or retaining mechanism known in the art may be used.

Air Outlets for Second Stage Cyclones Provided in a Wall of Common Manifold, Which may be a Pre-Motor Filter Chamber The following is a description of the connection of the second stage cyclone chamber air outlets with an upstream chamber of a pre-motor filter for the second cyclonic cleaning that may be used by itself in any surface cleaning apparatus or in any combination or sub-combination with any other feature or features disclosed herein including the sizing of a second stage cyclone compared to a first stage cyclone, the positioning of a dirt collection region for second stage cyclones and a dual opening latching mechanism.

In accordance with this feature, the air outlets of a plurality of cyclone chambers that are connected in parallel may be connected directly to an upstream pre-motor filter chamber or manifold. Accordingly, some or all of the air outlets may extend to opening provided in the manifold. Accordingly, a manifold for the air outlets, which is upstream from the pre-motor filter chamber, is not provided.

Optionally, the upstream pre-motor filter chamber or manifold may be positioned in facing relationship with the air outlets of a plurality of cyclone chambers that are connected in parallel. Accordingly, the upstream face of the pre-motor filter may be positioned generally transverse to the axis of the cyclone air outlets, and the axis of the cyclone air outlets may be generally parallel to the cyclone of which they are the air exits. Therefore, for example, the manifold may be positioned below a second cyclonic cleaning stage and each of the second stage cyclone air outlets may have an outlet end in a wall of the chamber or manifold. An advantage of this design is that fewer conduit walls and/or ducting may be required to direct airflow from the second cyclonic cleaning stage towards the suction unit, which may simplify the design and/or construction of the cyclone assembly and/or surface cleaning apparatus, and/or may reduce backpressure through the surface cleaning apparatus.

As exemplified in FIGS. 9-11, air exiting the second stage air outlets 124a-f is directed into a chamber or header or manifold 27 bounded by the lower surface 134 of the lower end wall 130 of cyclone assembly 100 and the upper end of the suction unit 20. From there, the air is directed by the suction motor through the suction unit 20 and subsequently exhausted out through the clean air outlet 18.

In alternative embodiments, cyclone assembly 100 may include one or more additional manifolds downstream of the second stage air outlets 124a-f so that cyclone assembly 100 has a single assembly air outlet or fewer air outlets than there are second stage cyclone chambers.

As exemplified, the chamber or header or manifold is a pre-motor filter chamber that houses a pre-motor filter. In such a construction, the pre-motor filter chamber may be opened when the cyclone bin assembly is removed. For example, the cyclone bin assembly may form part of the pre-motor filter chamber (e.g., an upstream wall of the pre-motor filter chamber). An advantage of this design is that the pre-motor filter chamber is opened when the cyclone bin assembly is removed. Accordingly, when a user removes the cyclone bin assembly (e.g. to empty the dirt collection chamber(s)), the user may also inspect the condition of the pre-motor filter. The pre-motor filter may be any suitable type of porous filter media, such as a foam filter and/or a felt filter, or any other suitable pre-motor porous filter media(s) known in the art. Preferably, the pre-motor filter is removable to allow a user to clean and/or replace the filter when it is dirty.

Typically, a pre-motor filter is provided to prevent particulate matter that is not removed from the airstream by the cyclonic cleaning stages from being drawn into the suction motor. Otherwise, this unremoved particulate matter may cause damage to (or otherwise impair) the suction motor.

While the use of a pre-motor filter may be effective at protecting the suction motor, there may be one or more disadvantages. For example, the pre-motor filter may become clogged with particulate matter, requiring a user to clean and/or replace the filter, a task a user may regard as undesirable.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A cyclone bin assembly for a surface cleaning apparatus, the cyclone bin assembly having first and second longitudinally spaced apart ends, the cyclone bin assembly comprising:
 (a) a first cyclonic cleaning stage comprising at least one first stage cyclone having a first stage cyclone chamber and a first stage dirt collection chamber external to the cyclone chamber, the first cyclonic cleaning stage having a longitudinal axis and first and second longitudinally spaced apart ends wherein the first end is moveable between a closed position in which the first stage cyclone chamber and the first stage dirt collection chamber are closed and an open position in which the first stage cyclone chamber and the first stage dirt collection chamber are open; and,
 (b) a second cyclonic cleaning stage downstream from the first cyclonic cleaning stage and comprising a plurality of second stage cyclones in parallel and at least one second stage dirt collection chamber external to the cyclone chambers, wherein each of the plurality of second stage cyclones has a second stage cyclone chamber, the second cyclonic cleaning stage having a longitudinal axis and first and second longitudinally spaced apart ends, wherein each of the second stage cyclone chambers has first and second longitudinally spaced apart ends and the at least one second stage dirt collection chamber has first and second longitudinally spaced apart ends,
 wherein the second cyclonic cleaning stage is axially aligned with and faces the first cyclonic cleaning stage whereby the first end of the second cyclonic cleaning stage is proximal to the second end of the first cyclonic cleaning stage and the second end of the second cyclonic cleaning stage is axially spaced from the first end of the second cyclonic cleaning stage, and
 wherein the second end of the second cyclonic cleaning stage is moveable between a closed position in which the second end of each of the second stage cyclone chambers and the second end of the at least one second stage dirt collection chamber are each closed concurrently and an open position in which the second end of each of the second stage cyclone chambers and the second end of at least one second stage dirt collection chamber are each opened concurrently.

2. The cyclone bin assembly of claim 1 wherein the at least one second stage dirt collection chamber is centrally positioned, in a transverse direction, in the second cyclonic cleaning stage.

3. The cyclone bin assembly of claim 2 wherein the second stage cyclone chambers are positioned around the at least one second stage dirt collection chamber.

4. The cyclone bin assembly of claim 3 wherein the at least one second stage dirt collection chamber comprises a plurality of second stage dirt collection chambers.

5. The cyclone bin assembly of claim 3 wherein the at least one second stage dirt collection chamber comprises a single second stage dirt collection chamber.

6. The cyclone bin assembly of claim 1 wherein the at least one second stage dirt collection chamber is axially spaced from and faces an air outlet of the first stage cyclone chamber.

7. The cyclone bin assembly of claim 1 wherein the first stage cyclone chamber has an air outlet at the second end of the first cyclonic cleaning stage, the second stage cyclone chambers have air inlets at the first end of the second cyclonic cleaning stage and the first end of the second cyclonic cleaning stage faces the second end of the first cyclonic cleaning stage.

8. The cyclone bin assembly of claim 1 wherein the first stage cyclone chamber has an air inlet at the second end of the first cyclonic cleaning stage, an air outlet at the second end of the first cyclonic cleaning stage and the dirt outlet is provided at the second end of the first cyclonic cleaning stage and the second stage cyclone chambers have air inlets at the first end of the second cyclonic cleaning stage.

9. The cyclone bin assembly of claim 8 wherein the second stage cyclone chambers have air outlets at the second end of the second cyclonic cleaning stage.

10. The cyclone bin assembly of claim 8 wherein the air inlets of the second stage cyclone chambers are centrally positioned, in a transverse direction.

11. The cyclone bin assembly of claim 10 wherein the air inlets of the second stage cyclone chambers are axially spaced from and face an air outlet of the first cyclonic cleaning stage.

12. The cyclone bin assembly of claim 1 wherein the first end of the first cyclonic cleaning stage and the second end of the second cyclonic cleaning stage are provided at the first and second longitudinally spaced apart ends of the cyclone bin assembly.

13. The cyclone bin assembly of claim 1 wherein the first stage cyclone chamber has an air outlet at the second end of the first cyclonic cleaning stage and the first stage cyclone chamber has a dirt outlet provided at the second end of the first cyclonic cleaning stage and wherein the second stage cyclone chambers have air outlets at the second end of the second cyclonic cleaning stage and the second stage cyclone chambers have dirt outlets provided at the second end of the second cyclonic cleaning stage.

14. The cyclone bin assembly of claim 13 wherein the second stage cyclone chambers have air inlets at the first end of the second cyclonic cleaning stage.

15. The cyclone bin assembly of claim 14 wherein the air inlets of the second stage cyclone chambers are centrally positioned, in a transverse direction.

16. A cyclone bin assembly for a surface cleaning apparatus, the cyclone bin assembly having first and second longitudinally spaced apart ends, the cyclone bin assembly comprising:
(a) a first cyclonic cleaning stage comprising at least one first stage cyclone having a first stage cyclone chamber and a first stage dirt collection chamber external to the cyclone chamber, the first cyclonic cleaning stage having a longitudinal axis and first and second longitudinally spaced apart ends wherein the first end is moveable between a closed position in which the first stage cyclone chamber and the first stage dirt collection chamber are closed and an open position in which the first stage cyclone chamber and the first stage dirt collection chamber are open; and,
(b) a second cyclonic cleaning stage downstream from the first cyclonic cleaning stage and comprising a plurality of second stage cyclones in parallel and at least one second stage dirt collection chamber external to the cyclone chambers, wherein each of the plurality of second stage cyclones has a second stage cyclone chamber, the second cyclonic cleaning stage having a longitudinal axis and first and second longitudinally spaced apart ends, wherein each of the second stage cyclone chambers has first and second longitudinally spaced apart ends and the at least one second stage dirt collection chamber has first and second longitudinally spaced apart ends,
wherein the second cyclonic cleaning stage overlies the first cyclonic cleaning stage, and
wherein the second end of the second cyclonic cleaning stage is moveable between a closed position in which the second end of each of the second stage cyclone chambers and the second end of the at least one second stage dirt collection chamber are each closed concurrently and an open position in which the second end of each of the second stage cyclone chambers and the second end of the at least one second stage dirt collection chamber are each opened concurrently.

17. The cyclone bin assembly of claim 16 wherein the first stage cyclone chamber has an air outlet at the second end of the first cyclonic cleaning stage, the second stage cyclone chambers have air inlets at the first end of the second cyclonic cleaning stage and the first end of the second cyclonic cleaning stage faces the second end of the first cyclonic cleaning stage.

18. The cyclone bin assembly of claim 16 wherein the first stage cyclone chamber has an air inlet at the second end of the first cyclonic cleaning stage, an air outlet at the second end of the first cyclonic cleaning stage and the dirt outlet is provided at the second end of the first cyclonic cleaning stage and the second stage cyclone chambers have air inlets at the first end of the second cyclonic cleaning stage.

19. A cyclone bin assembly for a surface cleaning apparatus, the cyclone bin assembly having first and second longitudinally spaced apart ends, the cyclone bin assembly comprising:
(a) a first cyclonic cleaning stage comprising at least one first stage cyclone having a first stage cyclone chamber and a first stage dirt collection chamber external to the cyclone chamber, the first cyclonic cleaning stage having a longitudinal axis and first and second longitudinally spaced apart ends wherein the first end is moveable between a closed position in which the first stage cyclone chamber and the first stage dirt collection chamber are closed and an open position in which the first stage cyclone chamber and the first stage dirt collection chamber are open and wherein the first stage cyclone chamber has an air outlet at the second end of the first cyclonic cleaning stage; and,
(b) a second cyclonic cleaning stage downstream from the first cyclonic cleaning stage and comprising a plurality of second stage cyclones in parallel and at least one second stage dirt collection chamber external to the cyclone chambers, wherein each of the plurality of second stage cyclones has a second stage cyclone chamber, the second cyclonic cleaning stage having a longitudinal axis and first and second longitudinally spaced apart ends, the second stage cyclone chambers have air inlets at the first end of the second cyclonic cleaning stage and the first end of the second cyclonic cleaning stage faces the second end of the first cyclonic cleaning stage, wherein each of the second stage cyclone chambers has first and second longitudinally spaced apart ends and the at least one second stage dirt collection chamber has first and second longitudinally spaced apart ends, wherein the first end of the second cyclonic cleaning stage is proximal to the second end of the first cyclonic cleaning stage and the second end of the second cyclonic cleaning stage is axially spaced from the first end of the second cyclonic cleaning stage, and wherein the second end of the second cyclonic cleaning stage is moveable between a closed position in which the second end of each of the second stage cyclone chambers and the second end of the at least one second stage dirt collection chamber are each closed concurrently and an open position in which the second end of each of the second stage cyclone chambers and the second end of the at least one second stage dirt collection chamber are each opened concurrently.

* * * * *